(12) United States Patent
Morimoto

(10) Patent No.: US 6,873,148 B2
(45) Date of Patent: Mar. 29, 2005

(54) POSITION DETECTING APPARATUS, AND OPTICAL APPARATUS COMPRISING THIS AND POSITION DETECTING METHOD

(75) Inventor: Yosuke Morimoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/600,766

(22) Filed: Jun. 23, 2003

(65) Prior Publication Data

US 2004/0000903 A1 Jan. 1, 2004

(30) Foreign Application Priority Data

Jun. 28, 2002 (JP) .......................................... 2002-191370
Jun. 12, 2003 (JP) .......................................... 2003-168384

(51) Int. Cl.$^7$ ................................................ G01B 7/00
(52) U.S. Cl. ........................... 324/207.12; 324/207.21; 324/207.24; 318/652
(58) Field of Search ........................ 324/207.11, 207.12, 324/207.21, 207.22, 207.23, 207.24–207.26; 318/632–634, 652–653

(56) References Cited

U.S. PATENT DOCUMENTS 5,453,684 A   9/1995   Nakayama ............. 324/207.12

FOREIGN PATENT DOCUMENTS

JP          6-105206        4/1994

*Primary Examiner*—Bot LeDynh
(74) *Attorney, Agent, or Firm*—Fitzpatrick, Cella, Harper & Scinto

(57) ABSTRACT

The present invention discloses a position detecting apparatus that can adequately perform gain adjustment and offset adjustment and can suppress deterioration in position detection accuracy. The position detecting apparatus according to the present invention includes a position sensor outputting at least two phases of position detecting signals according to the movement of an object, and a signal adjusting unit performing the gain and offset adjustment of each position detecting signal by using adjustment data. In addition, the position detecting apparatus includes a counter that counts a wave number from a reference position, and a memory circuit that stores adjustment data corresponding to the wave number. Then, the signal adjusting unit adjusts gains and offsets of the position detecting signals on the basis of the adjustment data that corresponds to the counted wave number and is stored in the memory circuit.

23 Claims, 22 Drawing Sheets

POSITION DETECTING APPARATUS, AND OPTICAL APPARATUS COMPRISING THIS AND POSITION DETECTING METHOD

BACKGROUND OF THE INVENTION

1. Field of the Invention

The present invention relates to a position detecting apparatus and a position detecting method each of which uses a magneto-resistive (MR) element, an optical sensor, and the like, and further an optical apparatus that uses these.

2. Description of Related Art

Conventionally, a position detecting apparatus that uses a magnetoresistive element (hereinafter, this is called an MR element) detects a position by selecting a phase having a signal component with excellent linearity among sinusoidal signal components from the MR element with a plurality of phases, and by performing the calculation of interpolating the signal component.

Here, in general, outputs with a plurality of phases from the MR element are different in their amplitude and levels of their amplitude centers as shown in FIG. 22. Their gains and offsets are adjusted so that the amplitude and the amplitude centers may became in similar levels respectively as shown in FIG. 23 since enough accuracy is not obtained when the outputs are used for position detection as it is.

Gains and offsets of outputs of an MR element vary by assembly errors of the sensor, errors of electric characteristics of circuits, a characteristic change of the sensor due to temperature, and the like in an individual product. It is necessary to adjust the gains and offsets adequately according to these so as to keep the high accuracy of position detection of a lens.

The following means is proposed as a method for performing this adjustment. Namely, a lens that is a measuring object is moved longer than one period of a sine wave output of an MR sensor at the time of power-on or a system reset. At that time, gain and offset adjustment data are obtained from maximum and minimum values of sensor outputs, sampled in a specific period, from an A/D converter.

Then, the gains and offsets are adjusted by processing the sensor output data, fetched from the A/D converter, by using this adjustment data so that the amplitude and amplitude centers may become in similar levels respectively.

Namely, the lens that is a measuring object is moved longer than one period of a sine wave output of the MR sensor. Specifically, let MAX and MIN be the maximum value and minimum value of the MR sensor output respectively, and the gain GAIN and offset OFFET that are the adjustment data are calculated from the following Expressions (1) and (2). Nevertheless, RANGE denotes a dynamic range of the sensor output data after adjustment.

$$GAIN = \frac{RANGE}{MAX - MIN} \quad (1)$$

$$OFFSET = \frac{MAX + MIN}{2} \quad (2)$$

An output OUTPUT, whose gain and offset are adjusted, is obtained by applying a correction expression of Expression (3) to the MR sensor output MR from GAIN and OFFSET that are obtained here.

$$OUTPUT = (MR - OFFSET) \times GAIN \quad (3)$$

Such gain and offset adjustment of an output from an MR sensor is proposed in Japanese Patent Laid-Open No. H06 (1994)-105206 (corresponding to U.S. Pat. No. 5,453,684).

Nevertheless, only after the lens moves by one period of a sine wave output of the MR sensor, adjustment data (GAIN and OFFSET) can be obtained in the above-described conventional example. Therefore, as shown in FIG. 24, when the lens is in a position P, the adjustment data are obtained by using a maximum value MAX1 and a minimum value MIN1 in an adjacent period thereof, not by using a maximum value MAX2 and a minimum value MIN2 in a sine wave period where the lens exists currently.

In general, the amplitude of an output signal from an MR sensor varies depending on a lens position in the direction of a measurement axis because of an assembly error of a sensor magnet, and the like. Hence, it may arise that the accuracy of position detection decreases since correct adjustment data in a current position of the lens is not obtained by the above-described method.

In addition, in the above-described conventional example, adjustment data are not updated when the lens repeats long-time moves or stays for a long time in a range within one period or less of a sine wave output of the MR sensor. Hence, it may arise that the accuracy of position detection decreases since a gain fluctuation and/or an offset fluctuation that are caused by a temperature change in the meantime are note adjusted.

Moreover, since a sampling rate becomes low at the time of fetching an MR sensor output into an A/D converter when the moving speed of the lens is fast, it is not possible to surely fetch maximum and minimum values of the sensor output. Therefore, when the lens moves at more than a specific speed, it may arise that the accuracy of position detection decrease since neither the gain adjustment nor the offset adjustment are correctly performed.

Namely, in order to obtain the maximum value MAX and the minimum value MIN in one period of the MR sensor output accurately, it is necessary to surely sample the maximum value and minimum value by moving the lens at sufficiently low speed as shown in FIG. 25. This is because it is not possible to sample the maximum value and minimum value in one period since sampling becomes rough in comparison with the one period as shown in FIG. 26 when the lens moves at high speed.

On the other hand, the position calculation is performed at the time of power-on or a system reset by using predetermined suitable initial data since the maximum value and minimum value in one period of the NR sensor output are uncertain. However, it is not possible to perform accurate position calculation since this initial data is not obtained with the above-described errors being considered.

Here, when the position detection by an MR element is used for the position control of a lens in an optical system, the control of the lens is achieved by servo control of feeding back the result of position detection by the MR element. However, the lens control becomes unstable by the above-described reason since the position calculation is inaccurate at the time of the power-on or system reset. Hence, a phenomenon that the lens moves to a mechanical limit at high speed at a dash arises.

Therefore, since sampling roughens immediately after the power-on or system reset since the moving speed of the lens is too fast, it is not possible to obtain the accurate maximum value and minimum value of the MR sensor output.

Up to now, adjustment data (GAIN and OFFSET) obtained by making the moving speed controllable by performing the control of reciprocating the lens two or more times. Nevertheless, though accurate adjustment data is obtained by this method, extra lens reset time is required because of reciprocating the lens two or more times.

SUMMARY OF THE INVENTION

The present invention aims to provide a position detecting apparatus and a position detecting method that can adequately perform gain adjustment and offset adjustment and can suppress the decrease in position detection accuracy.

In addition, the present invention aims to provide a position detecting apparatus and a position detecting method that can quickly stabilize the control of an object immediately after power-on or a system reset.

A position detecting apparatus according to the present invention includes a position sensor that outputs at least two-phases of position detecting signals that change periodically or sinusoidally according to the movement of an object; a signal adjusting unit that performs gain and offset adjustment of each of the position detecting signals by using adjustment data; an calculation unit that obtains a position of the object on the basis of the position detecting signals whose gains and offsets are adjusted; a counter that counts a wave number of the position detecting signals from a reference position; and a memory circuit that stores adjustment data corresponding to the wave number. Then, the signal adjusting unit adjusts gains and offsets of the position detecting signals on the basis of the adjustment data that is stored in the memory circuit and corresponds to the wave number that was counted by the counter.

In addition, a position detecting method according to the present invention is a method of adjusting gains and offsets of at least two phases of position detecting signals that change periodically or sinusoidally and are outputted from a position sensor according to the movement of an object, and obtaining a position of the object on the basis of the position detecting signals whose gains and offsets are adjusted. Furthermore, the position detecting method has a step of counting a wave number of the position detecting signals from a reference position: a step of obtaining adjustment data corresponding to the wave number that was counted; and a step of adjusting gains and offsets of the position detecting signals on the basis of the obtained adjustment data.

Moreover, a position detecting apparatus according to the present invention includes a position sensor that outputs at least two-phases of position detecting signals that change periodically or sinusoidally according to the movement of an object, a signal adjusting unit that performs gain and offset adjustment of each of the position detecting signals by using adjustment data, an calculation unit that obtains a position of the object on the basis of the position detecting signals whose gains and offsets are adjusted, and a nonvolatile memory circuit that can store the adjustment data nonvolatilely. Then, the nonvolatile memory circuit maintains storing the adjustment data at least until the position detecting apparatus operates this time. In addition, at the time of this operation start above described, the signal adjusting unit performs the gain and offset adjustment by using the adjustment data that is stored in the nonvolatile memory circuit.

Furthermore, a position detecting method according to the present invention adjusts gains and offsets of an at least two phases of position detecting signals that change periodically or sinusoidally and are outputted from a signal output unit according to the movement of an object, and obtains a position of the object on the basis of the position detecting signals whose gains and offsets are adjusted. Then, the position detecting method has a first step of making the adjustment data, used for the gain and offset adjustment, stored nonvolatilely, and a second step of performing the gain and offset adjustment by using the stored adjustment data as initial data when starting position detecting operation after the first step.

The features of the position detecting apparatus, optical apparatus, and position detecting method according to the present invention will become clear by the explanation of the following specific embodiments with referring to drawings.

DETAILED DESCRIPTION OF THE PREFERRED EMBODIMENTS

Hereinafter, embodiments of the present invention will be explained with referring to drawings.

(Embodiment 1)

Figure 1:
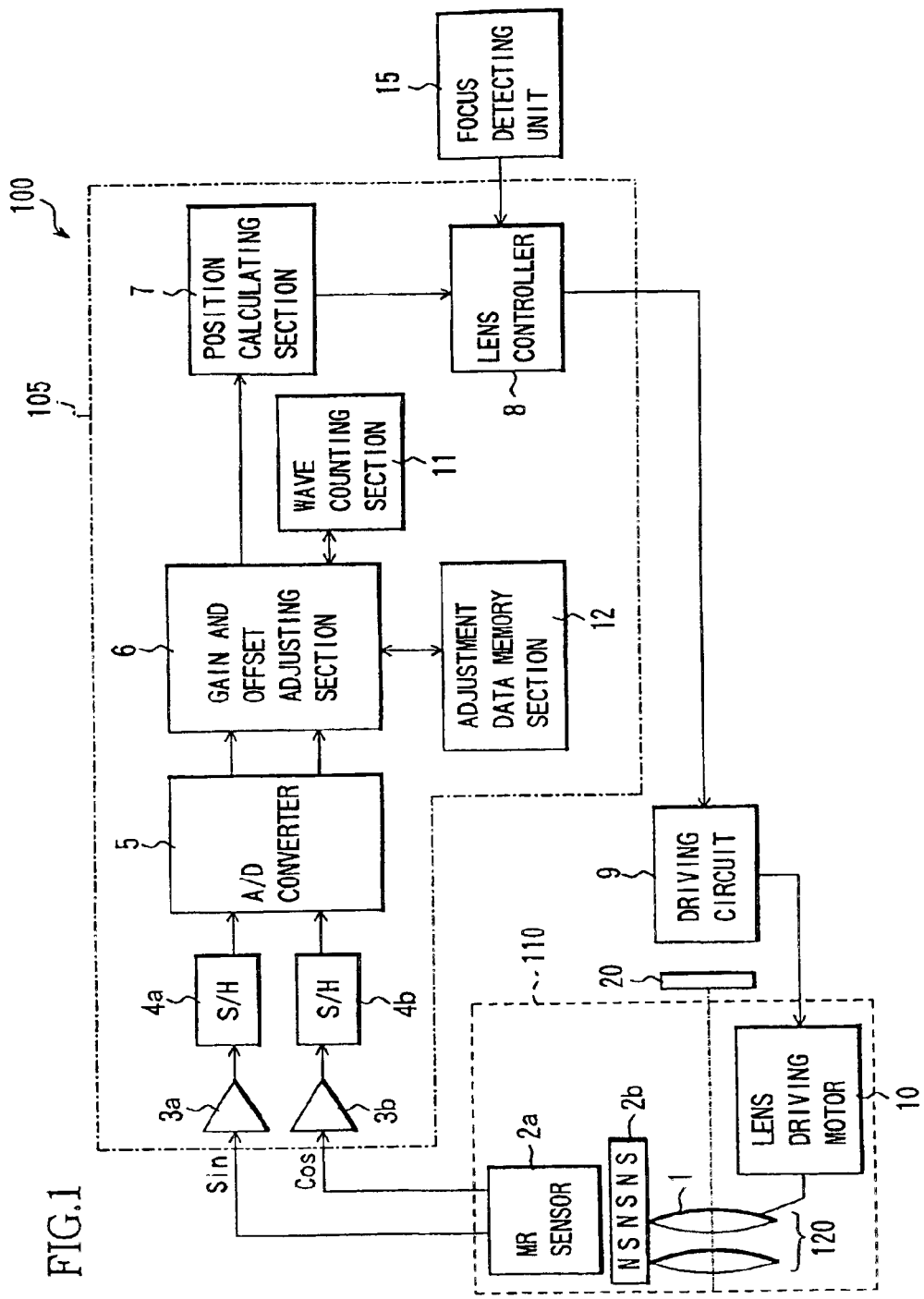
FIG. 1 is a block diagram showing the structure of a camera comprising a position detecting apparatus that is Embodiment 1 of the present invention.

FIG. 1 shows the structure of a camera (optical apparatus) comprising a position detecting apparatus that is Embodiment 1 of the present invention.

In FIG. 1, numerical reference 100 denotes a camera, and numerical reference 110 denotes a lens barrel provided in the camera 100. In addition, the present invention can be applied also to an interchangeable lens system though a camera integrated with a lens barrel is described in this embodiment.

Numerical reference 120 denotes an image pickup optical system provided in the lens barrel 110, and 1 denotes a focus lens (optical element) included in the image pickup optical system 120. This focus lens 1 moves in the direction of an optical axis (cross direction in FIG. 1) since a driving force from a lens driving motor 10 is transmitted through a driving mechanism not shown.

In addition, numerical reference 20 denotes an image pickup device such as a CCD, or a CMOS sensor, and receives a subject image formed by the image pickup optical system 120 and transduces it photoelectrically. A signal outputted from the image pickup device 20 becomes a picture signal by being given various types of processing by a processing circuit not shown. And, the signal is recorded on a recording medium (tape, semiconductor, and optical disk, etc.) not shown, and is displayed on an electronic viewfinder (LCD etc.) not shown.

FIG. 2(A) is an external perspective view of a position detecting apparatus according to this embodiment, and FIG. 2(B) is a sectional view taken in the A direction in FIG. 2(A). FIGS. 2(A) and 2(B) show an example of applying the position detecting apparatus according to this embodiment to the position detection of the focus lens 1 retained in a lens supporting frame 900 in the camera 100.

A detecting magnet (magnetic member) 2b that extends in the direction of an optical axis 902 (namely, in the direction of a measurement axis in the position detecting apparatus) and is magnetized in a specific pattern so as to become a reverse polarity alternately in the direction of the optical axis is arranged in the outer circumferential surface of the lens supporting frame 900 integrally. This detecting magnet 2b and an MR sensor 2a that are arranged with facing in a predetermined gap g detect the movement of the focus lens 1 in the x and x' directions along the direction of the optical axis.

The lens supporting frame 900 may be shorter or longer than the detecting magnet 2b though the lens supporting frame 900 is set to be equal to the detecting magnet 2b in length in the direction of the optical axis in FIG. 2(A). In addition, since the principle of the position detection, the structure, and the like of an MR sensor are publicly known, the explanation of them is omitted here.

Here, though such structure that the detecting magnet 2b can move integrally with the focus lens 1 (and, the lens supporting frame 900) as a measuring object is adopted, the present invention is not limited to this. It is also good to arrange the MR sensor in the side of the measuring object that moves.

When the lens supporting frame 900 moves in the x and x' directions to the MR sensor 2a (namely, when the MR sensor 2a and detecting magnet 2b relatively moves in the x and x' directions), two phases of sinusoidal position detecting signals are outputted from the MR sensor 2a according to its displacement.

In addition, in this embodiment, though outputs of the MR sensor 2a (position detecting signals) are made to be two phases, that is, a sine wave and a cosine wave, the scope of the present invention is not limited to this mode. For example, the present invention is also applicable to the outputs of the MR sensor with three or more phases. Here, a reason why at least two phases of position detecting signals are required is to detect a displacement amount by addition or subtraction of a wave number by a counter after determining the moving direction from the advance or delay of phases between two sinusoidal signals having phase difference.

In addition, the present invention is not limited to applications where output signals change sinusoidally like the outputs of an MR sensor, but can be also applied to ones whose output signals change periodically.

The position detecting signals from the MR sensor 2a corresponding to a position of the focus lens 1 in the x and x' directions are amplified by analog amplifiers 3a and 3b, and are given digital conversion by an A/D converter 5 through sample-and-hold circuits 4a and 4b. The gains and offsets of the outputs of the MR sensor 2a that are fetched in this manner are adjusted by a gain and offset adjusting section 6 for respective phases.

Thereafter, the position of the focus lens 1 that is the measuring object is calculated and determined by a position calculating section 7 on the basis of the position detecting signals whose gains and offsets are adjusted.

Thus, the lens position data obtained by the position calculating section 7 is sent to a lens controller 8. The lens controller 8 calculates the position of the focus lens 1, where the focusing of an image pickup optical system 120 is given, on the basis of the focusing state of the image pickup optical system 120 that is detected by a phase difference detection system etc. in a focus detecting unit 15. Furthermore, the lens controller 8 outputs a control signal for driving the focus lens 1 to a driving circuit 9 so that the lens position data may coincide with a calculated lens position. Then, the driving circuit 9 drives a lens driving motor 10 according to the inputted control signal. Owing to this, the position of the focus lens 1 is servo-controlled toward the focused position. In addition, a control method of the focus lens 1 is not limited to the above-described one.

Figure 3:
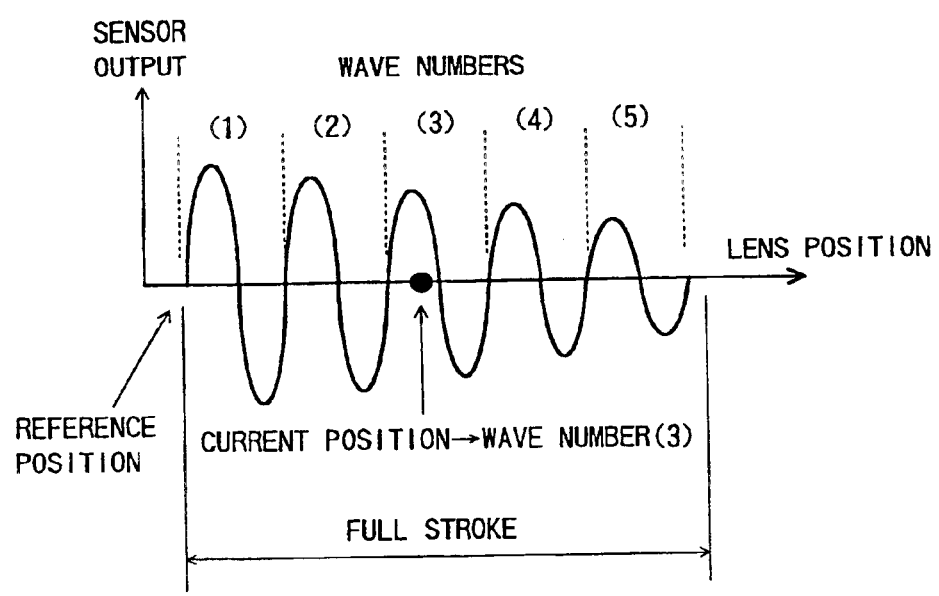
FIG. 3 is a graph showing wave numbers counted by a wave counting section in Embodiment 1.

Numerical reference 11 denotes a wave counting section (counter), which counts what wave number the position of the focus lens 1 (hereinafter, this is simply called a lens position) is from a reference position at a certain point in time as showing in FIG. 3. This graph shows a state that the focus lens 1 is in a third wave position.

Numerical reference 12 denotes an adjustment data memory section, which stores beforehand adjustment data corresponding to the wave number of the output position detecting signals outputted from the MR sensor 2a.

On the basis of the wave number in a current position of the focus lens 1 that is counted by the wave counting section 11, the gain and offset adjusting section 6 fetches adjustment data corresponding to the wave number from the adjustment data memory section 12. Then, the gain and offset adjusting section 6 adjusts a gain and an offset of the position detecting signal corresponding to the wave number by the above-described Expression (3) on the basis of this adjustment data.

In addition, it is acceptable that the adjustment data stored in the adjustment data memory section 12 is a maximum value MAX and a minimum value MIN, which are shown in Expressions (1) and (2), though the adjustment data is explained as values of GAIN and OFFSET that are shown in Expression (3) in this embodiment.

In addition, each component included in an area enclosed by dotted and dashed lines in FIG. 1 is constituted as hardware or software in a camera CPU 105 controlling various functions of the camera 100. However, it is also good to provide the components in a lens CPU controlling various functions of an interchangeable lens apparatus (not shown).

Figure 4:
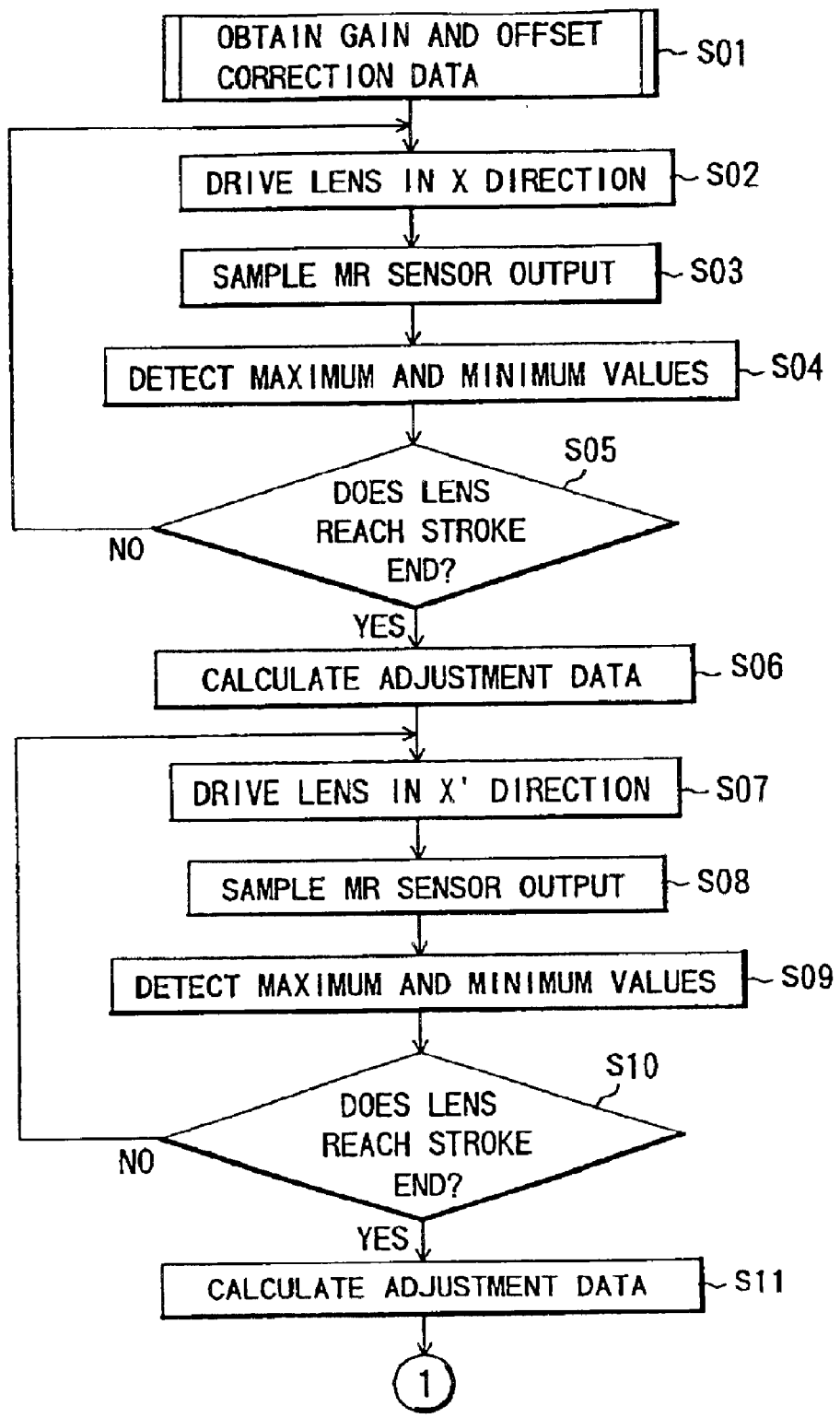
FIG. 4 is a flow chart showing the processing of obtaining adjustment information corresponding to each wave of a sensor output for a full stroke in Embodiment 1.
Figure 4:
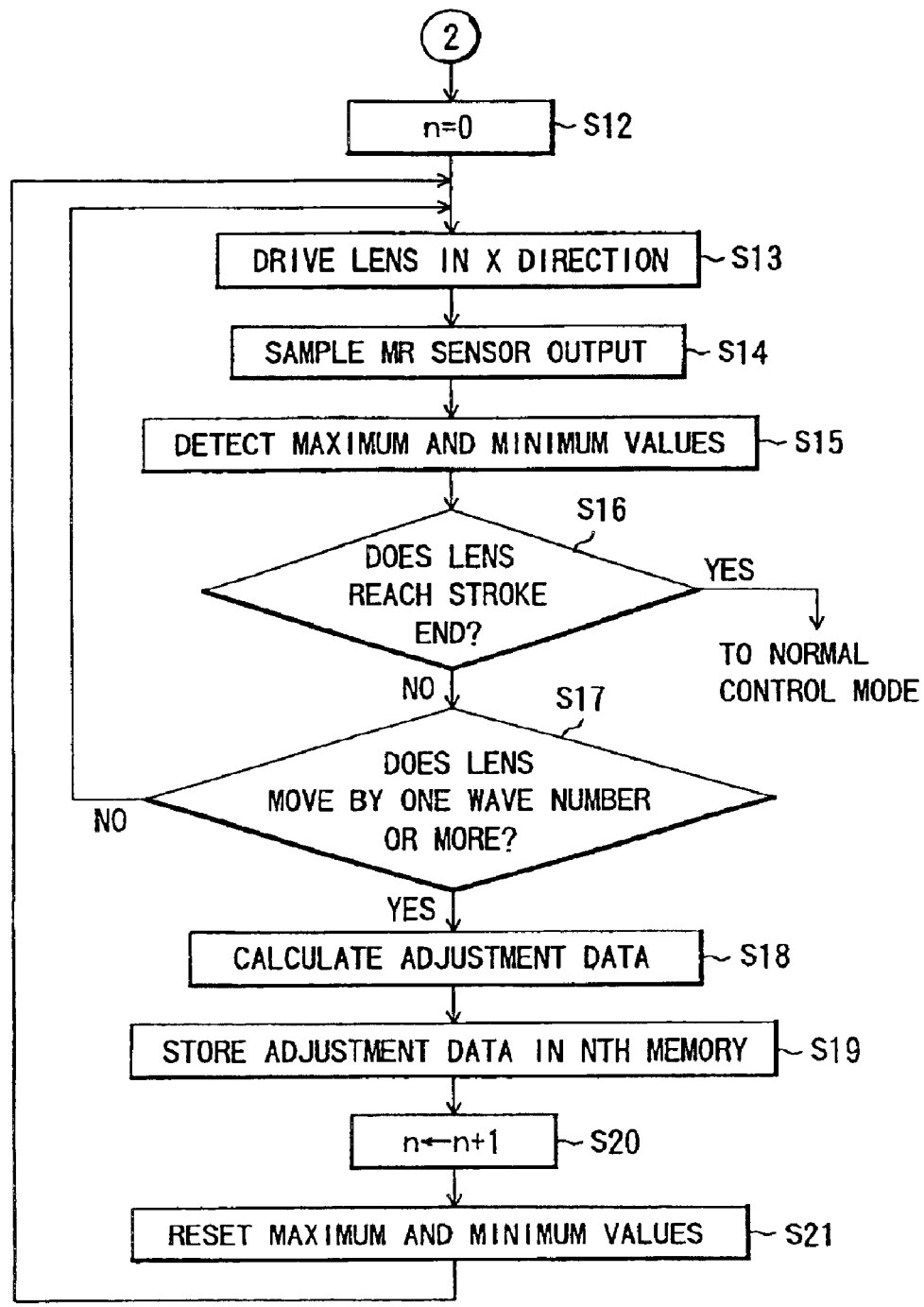

Hereinafter, the processing of obtaining adjustment data corresponding to each wave of a sensor output for a full stroke will be described with referring to a flow chart shown in FIG. 4. This processing is executed by the camera CPU 105 at the time of power-on or a reset of the lens system. In addition, the following processing is performed for each of plural phases of outputs of the MR sensor 2a.

Figure 2:
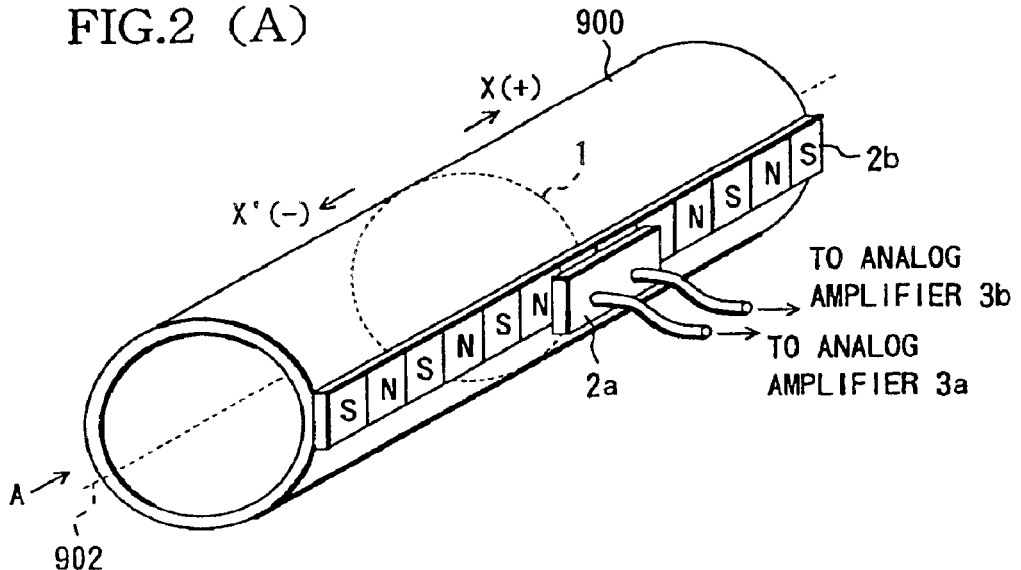
FIGS. 2(A) and 2(B) are schematic diagrams for explaining an MR sensor constituting the position detecting apparatus according to Embodiment 1.
FIG. 2(C) is a schematic diagram showing the structure of an optical sensor.
Figure 2:
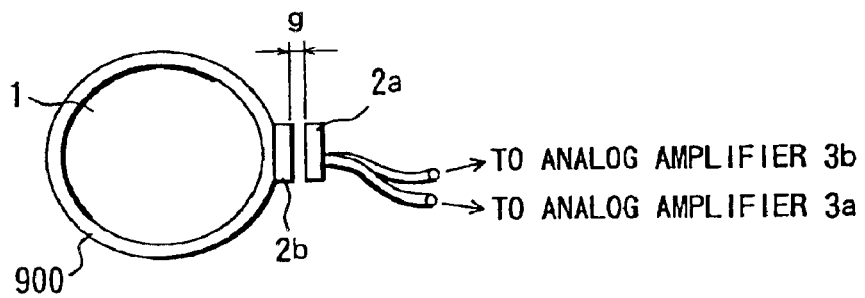
Figure 2:
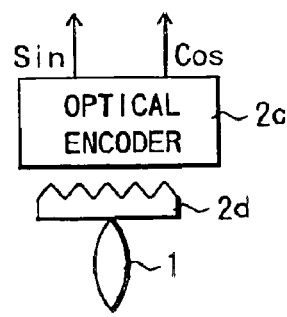

Firstly, at step S02, the camera CPU 105 makes the lens controller 8 sends a signal, which drives a focus lens 1 in the x direction (plus direction) in FIG. 2, to the driving circuit 9 so as to obtain rough adjustment data for servo-controlling the focus lens 1. Then, at steps S03 and S04, the camera CPU 105 makes the gain and offset adjusting section 6 detect maximum and minimum values of the outputs of the MR sensor 2a while the focus lens 1 moves. Moreover, the camera CPU 105 determines whether the focus lens 1 reaches a stroke end at step S05. Then the focus lens 1 reaches the stroke end, the camera CPU 105 calculates and stores adjustment data from the detected maximum and minimum values at step S06. Here, it is also good either to detect by an optical sensor etc. whether the focus lens 1 reaches the stroke end, or to determine whether a predetermined time has elapsed from driving start.

Next, so as to return the focus lens 1 to the reference position, the camera CPU 105 makes the lens controller 8 send a signal, which drives the focus lens 1 in the x' direction (minus direction) in FIG. 2, to the driving circuit 9 at step S07. At this time, the camera CPU 105 makes the gain and offset adjusting section 6 detect maximum and minimum values of the MR sensor outputs at steps S08 and S09 also while the focus lens 1 moves.

At step S10, the camera CPU 105 calculates adjustment data from the maximum and minimum values detected at step S11 when the focus lens 1 reaches the stroke end, and makes the adjustment data memory section 12 store the adjustment data. It is also good either to detect whether the focus lens 1 has reached the reference position by an optical sensor etc., or to determine whether a predetermined time has elapsed from driving start.

Subsequently, the camera CPU 105 obtains adjustment data every wave number. First of all, at step S12, the camera CPU 105 initializes a wave number counter n of the wave counting section 11 into zero. Then, the camera CPU 105 drives the focus lens 1 in the x direction (plus direction) in FIG. 2 at step S13, and makes the gain and offset adjusting section 6 detect the maximum and minimum values of the outputs of the MR sensor 2a at steps S14 and S15 while the focus lens 1 moves. The camera CPU 105 determines at step S16 whether the focus lens 1 has reached the stroke end while moving, and when it has reached the stroke end, the camera CPU 105 finishes data acquisition and shifts to a normal control mode.

On the other hand, when the focus lens 1 has not reached the stroke end yet, the camera CPU 105 determines from an output state of the MR sensor 2a at step S17 whether the focus lens 1 moves more than one wavelength. This determination can be performed, for example, by checking whether the output value of the MR sensor 2a changes from a negative value to a positive value.

Here, the process returns to step S13 when the focus lens 1 has not moved by one wave number yet, and the camera CPU 105 makes the gain and offset adjusting section 6 continue to detect the maximum and minimum values of the outputs of the MR sensor 2a. On the other hand, when determining that the focus lens 1 has moved more than one wave number, the camera CPU 105 makes the gain and offset adjusting section 6 calculate adjustment data from the maximum and the minimum values of the outputs of the MR sensor 2a, which are detected at that time, at step S18. Then, the camera CPU 105 makes this adjustment data stored in the nth storage area of the adjustment data memory section 12 at step S19.

Since the adjustment data worth of one wave is obtained by the above, the camera CPU 105 adds one to the wave counter n of the wave counting section 11 at step S20. The process returns to step S13 after the camera CPU 105 resets the maximum and minimum values at Step S21, and the above-described processing is repeated for a subsequent wave. This processing is repeated until the focus lens 1 reaches the stroke end.

In addition, this processing is executed every time on the power-on, reset, and adjustment of the reference position of the lens system, and the adjustment data is obtained each time. Hence, it is possible to use a volatile recording medium such as DRAM as the adjustment data memory section 12, which is preferable in the viewpoint of cost.

Figure 5:
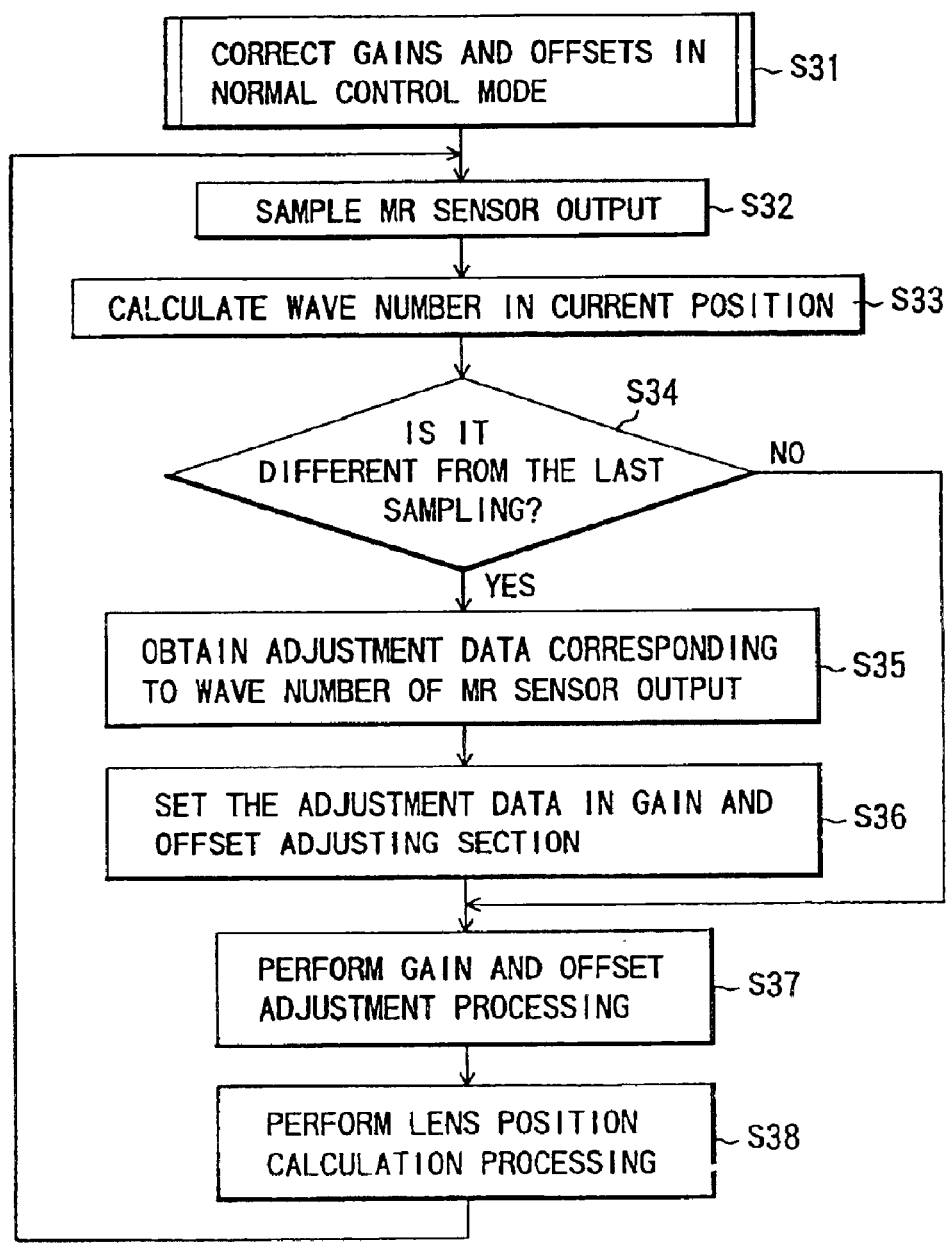
FIG. 5 is a flow chart showing gain adjustment processing and offset adjustment processing in a normal control mode in Embodiment 1.

Next, gain adjustment processing and offset adjustment processing in a normal control mode that the camera CPU 105 executes will be described according to a flow chart shown in FIG. 5. The following processing is performed for each of plural phases of outputs of the MR sensor 2a.

Firstly, the camera CPU 105 samples the outputs of the MR sensor 2a at step S32, and next, makes the wave counting section 11 obtain a wave number in a current position of the focus lens 1 at step S33. For example, it is possible to obtain wave numbers in the current position by making a wave number be zero in the state that the focus lens 1 is in the reference position When the focus lens 1 is reset and counting up or down the wave number according to a moving direction of the focus lens 1 each time the focus lens 1 moves by one wavelength of the output of the MR sensor 2a.

It is determined at step S34 whether the wave number in the current position obtained here is the same as that at the former sampling time. Since it is not necessary to update the adjustment data if being the same as that at the former sampling time, the process advances to gain adjustment processing and offset adjustment processing at step S37.

On the other hand, the process advances to step S35 if the wave numbers are different. At step S35, the camera CPU 105 makes the gain and offset adjusting section 6 obtain the adjustment data, corresponding to the current wave number, from the adjustment data memory section 12, and makes the gain and offset adjusting section 6 set this obtained adjustment data at step S36. Then, the camera CPU 105 makes the gain and offset adjusting section 6 perform the gain adjustment and offset adjustment by Expression (3) by using the set adjustment data at step S37.

At step S38, the CPU 105 makes the position calculating portion 7 perform lens position calculation processing by using the sensor output after the adjustment, and the process returns to step S32. In addition, the lens position data obtained by the lens position calculation processing is sent to the lens controller 8, and is used for the position control of the focus lens 1.

Owing to the structure shown in the above, it is possible to adequately adjust the gains and offsets of the outputs of the MR sensor 2a according to the wave number of the outputs of the MR sensor 2a in the current position of the focus lens 1. Consequently, it becomes possible to accurately grasp the phase relation between respective phases of sinusoidal signals that are the position detecting signals, and it is possible to improve measurement accuracy as a position detecting apparatus.

(Embodiment 2)

Figure 6:
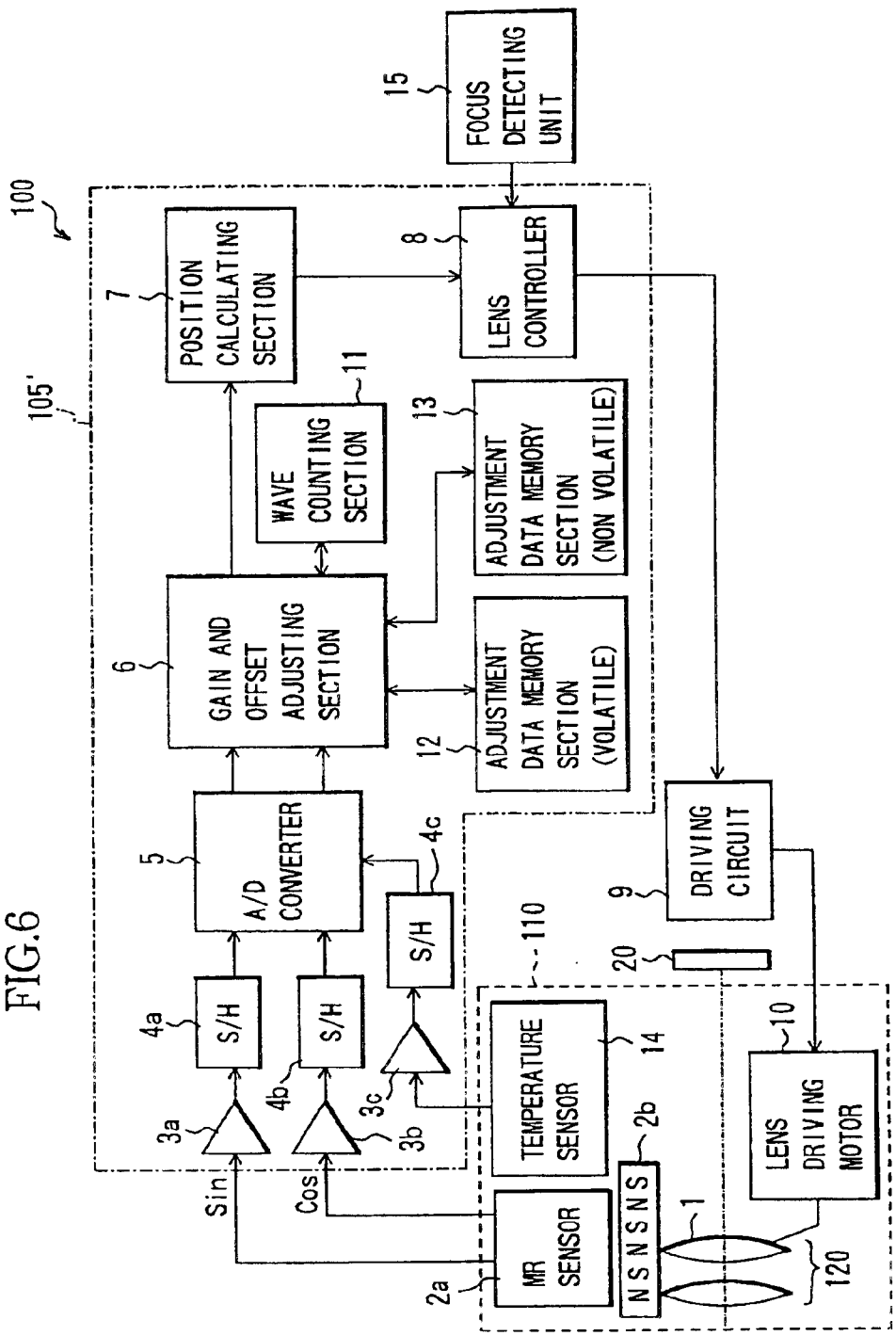
FIG. 6 is a block diagram showing the structure of a camera comprising a position detecting apparatus that is Embodiment 2 of the present invention.

FIG. 6 shows the structure of a camera (optical apparatus) comprising a position detecting apparatus that is Embodiment 2 of the present invention. In addition, the same numerical references are assigned in this embodiment to components common to those in Embodiment 1.

This embodiment has the structure of comprising an adjustment data memory section 13, where a nonvolatile storage medium is used, and a temperature sensor 14 in addition to Embodiment 1 above described. This temperature sensor 14 detects the temperature of a surrounding area of the MR sensor 2a (namely, an area whose temperature change influences the detection performance of the MR sensor 2a). The output of the temperature sensor 14 is amplified by an analog amplifier 3c provided in a camera CPU 105' and is converted digitally by an A/D converter 5 through a sample-hold circuit 4c. The structure of other portions except this is similar to that in Embodiment 1 above described.

In addition, when the camera 100 according to this embodiment has a function of correcting defocus due to temperature, namely, correcting a focusing position of the focus lens 1, which is calculated on the basis of data from a focus detecting unit 15, according to temperature, and suppressing focus point fluctuation due to the deformation of an image pickup optical system 120 and a mechanical member supporting this that is caused by a temperature change, it is also possible to use this temperature sensor 14 as a temperature sensor for correcting the focus point fluctuation. Owing to this, it is possible to reduce cost in comparison with the case that the temperature sensor 14 is provided independently of a temperature sensor for defocus correction, and, it is also possible to miniaturize a camera.

Furthermore, since the processing of obtaining the adjustment data corresponding to each wave of the outputs of the MR sensor 2a over a full stroke in a moving range of the focus lens in this embodiment is similar to that in Embodiment 1 above described, its description is omitted.

Hereinafter, processing of adjusting the gain and offset fluctuation of the MR sensor 2a to changes of environmental temperature and lens moving speed will be described. Nevertheless, since contents of gain and offset adjustment processing are almost similar to those in Embodiment 1 above described, hereinafter, the gain adjustment processing will be mainly described, and the offset adjustment processing will be described only for characteristic portions. In addition, the moving speed here means relative moving speed of the MR sensor 2a and detecting magnet 2b in an optical axis direction (x and x' directions).

The nonvolatile adjustment data memory section 13 is made to store the variability data of gain adjustment and offset adjustment of position detecting signals, corresponding to changes of lens moving speed and environmental temperature, beforehand as part of adjustment information.

Since the nonvolatile adjustment data memory section 13 is constituted by nonvolatile memory such as EEPROM, where contents are stored even when the power is turned off.

Figure 7:
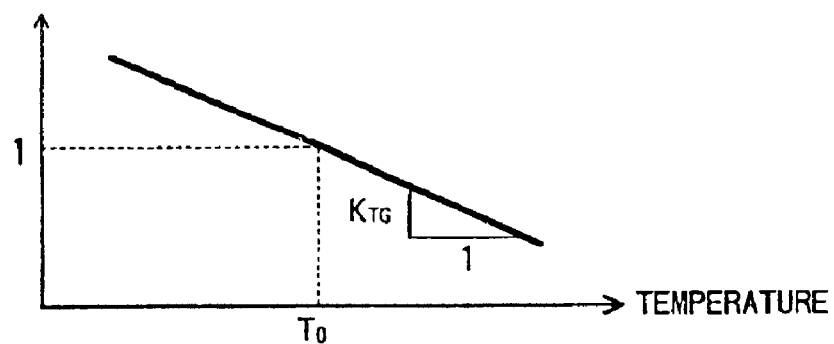
FIG. 7 is a graph showing a linear amplitude vs. temperature characteristic of an MR sensor output.
Figure 8:
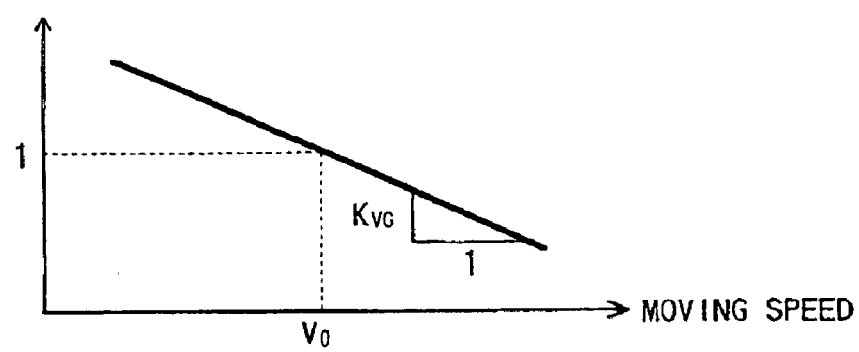
FIG. 8 is a graph showing a linear amplitude vs. lens moving speed characteristic of an MR sensor output.

Hereinafter, the gain adjustment processing at the time when it is assumed that the amplitude (MAX−MIN) of the output of the MR sensor 2a linearly changes to the temperature and speed as shown in FIGS. 7 and 8 will be described.

First of all, an inclination $K_{TG}$ [1/° C.] of the temperature variability of amplitude base on amplitude at reference temperature $T_0$ that is shown in FIG. 7, and an inclination $K_{VG}$ [1/(m/s)] of the speed variability of amplitude based on amplitude at the reference speed $V_0$ that is shown in FIG. 8 are obtained by a sensor characteristic test as variability data. These variability data is stored in the nonvolatile adjustment data memory section 13.

When the processing that a gain GAIN is obtained and stored every wave and that is described in Embodiment 1 is executed, a gain $GAIN_0$ at the reference temperature $T_0$ and reference speed V, which is obtained by Expression (4), instead of the gain GAIN obtained by Expression (1) is stored in the volatile adjustment data memory section 12. Here, $T_{INIT}$ denotes the temperature that is obtained by sampling an output from the temperature sensor 14 when the data of each wave number is obtained. In addition, $V_{INIT}$ denotes the lens speed at the time of obtaining the data of each wave. If the lens speed is controlled to become $V_{INIT} = V_0$, the calculation of the last term in the right side is omissible.

$$GAIN_0 = \frac{RANGE}{MAX - MIN}\{1 + K_{TG}(T_{INIT} - T_0)\}\{1 + K_{VG}(V_{INIT} - V_0)\} \quad (4)$$

The correction processing at the normal operation that uses this adjustment data is performed as follows. The processing comprises the steps of sampling outputs of the MR sensor 2a, obtaining a wave number at a current lens position in the wave counting section 11, and obtaining gain adjustment data $GAIN_0$ in the current wave number from the adjustment data memory section 12. These processing is performed similarly to the case described in Embodiment 1.

Moreover, the processing further comprises the steps of also sampling an output T from the temperature sensor 14 when the outputs from the MR sensor 2a are sampled, obtaining the moving speed V of the focus lens 1 from target speed or a target position of lens servo-control, and obtaining a gain GAIN corresponding to the temperature T and moving speed V by Expression (5).

$$\text{GAIN} = \frac{G_0}{\{1 + K_{TG}(T - T_0)\}\{1 + K_{VG}(V - V_0)\}} \quad (5)$$

The gain adjustment of the outputs from the MR sensor 2a is performed by the gain and offset adjusting section 6 by using the gain GAIN obtained in this manner. Hereinafter, the lens position calculation etc. are executed similarly to those in Embodiment 1.

Figure 9:
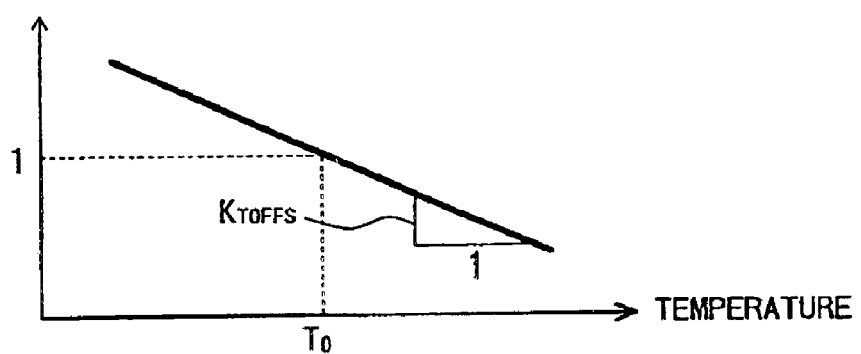
FIG. 9 is a graph showing a linear amplitude center vs. temperature characteristic of an MR sensor output.
Figure 10:
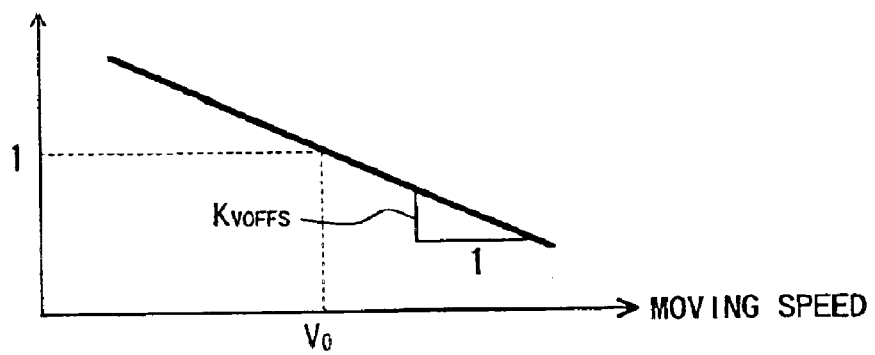
FIG. 10 is a graph showing a linear amplitude center vs. lens moving speed characteristic of an MR sensor output.

In addition, as for the offset, the offset adjustment is performed similarly to Embodiment 1 by using Expression (6) instead of Expression (4) and by using Expression (7) instead of Expression (5). Here, $K_{TOFFS}$ [1/° C.] denotes an inclination of the temperature variability of the amplitude center based on an amplitude center at the reference temperature $T_0$ as shown in FIG. 9. In addition, $K_{VOFFS}$ [1/(m/s)] denotes an inclination of a speed variability of the amplitude center based on the amplitude center at the reference speed $V_0$ as shown in FIG. 10. Both are stored in the nonvolatile adjustment data memory section 13 after being obtained in the sensor characteristic test.

$$OFFSET_0 = \frac{\text{MAX} + \text{MIN}}{2\{1 + K_{TOFFS}(T_{INIT} - T_0)\}\{1 + K_{VOFFS}(V_{INIT} - V_0)\}} \quad (6)$$

$$OFFSET = OFFSET_0\{1 + K_{TOFFS}(T - T_0)\}\{1 + K_{VOFFS}(V - V_0)\} \quad (7)$$

Owing to the above processing, it becomes possible to perform appropriate adjustment also to the fluctuation of the outputs of the MR sensor 2a due to a change of environmental temperature and a change of the lens moving speed. Namely, variability information corresponding to the change of environmental temperature around the MR sensor 2a, and variability data corresponding to the change of the relative moving speed between the MR sensor 2a and detecting magnet 2b are made to be stored in the nonvolatile adjustment data memory section 13 beforehand. Then, when the gain adjustment and offset adjustment of the position detecting signals is performed in the gain and offset adjusting section 6, the gain adjustment and offset adjustment of the position detecting signals are performed on the basis of the variability data corresponding to the environmental temperature and relative speed at that time.

In addition, though the gain adjustment and offset adjustment that are based on the variability data corresponding to both of the environmental temperature and relative speed are performed in this embodiment, the present invention is not limited to this. That is, it is also possible to perform the gain adjustment and offset adjustment that is based on the variability data corresponding to only the environmental temperature or the variability data corresponding to only the relative speed.

In the above description, the adjusting method at the time when it is assumed that the output amplitude (MAX–MIN) of the MR sensor 2a linearly changes to the temperature and speed is described. Nevertheless, depending on characteristics of the MR sensor 2a and amplifier circuits 3a to 3c, etc., the output amplitude of the MR sensor 2a curvilinearly changes to the temperature and speed. Hence, it may be supposed that the linear approximation is insufficient. Hereinafter, a gain adjusting method in such a case will be described.

Figure 11:
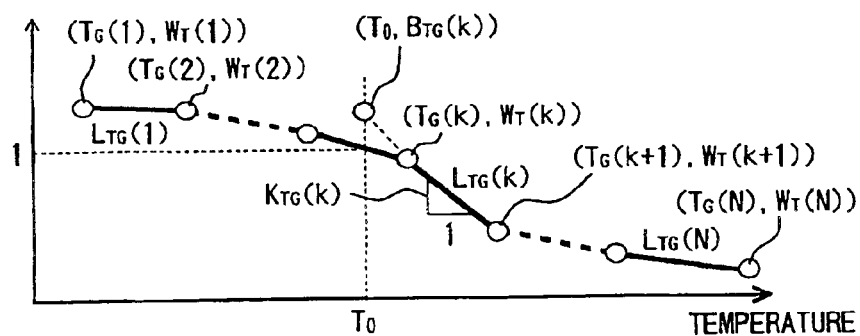
FIG. 11 is a graph showing a curvilinear amplitude vs. temperature characteristic of an MR sensor output.
Figure 12:
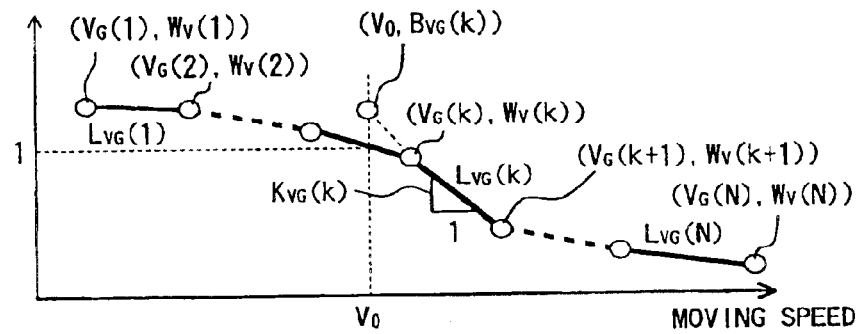
FIG. 12 is a graph showing a curvilinear amplitude vs. lens moving speed characteristic of an MR sensor output.

First of all, a temperature variability of amplitude based on amplitude at the reference temperature $T_0$, and a speed variability of amplitude based on amplitude at the reference speed $V_0$ are obtained by a sensor characteristic test. Then, they are approximated with polygonal lines $L_{TG}(1)$ to $L_{TG}(N)$, and $L_{VG}(1)$ to $L_{VG}(N)$ as shown in FIGS. 11 and 12 respectively.

On the basis of this data, temperature $T_G(k)$ at a breaking point of the temperature variability of amplitude, speed $V_G(k)$ at a breaking point of the velocity variability of amplitude, and data $K_{TG}(k)$, $B_{TG}(k)$, $K_{VG}(k)$, and $B_{VG}(k)$ that are expressed in Expressions (8) to (11) are stored for k=1 to N respectively as adjustment data in the nonvolatile adjustment data memory section 13. Here, $K_{TG}(k)$ [1/° C.] denotes an inclination of a polygonal line $L_{TG}(k)$, and $B_{TG}(k)$ denotes an intercept when $L_{TG}(k)$ is extended to $T=T_0$. In addition, $K_{VG}(k)$ [1/(m/s)] denotes an inclination of a polygonal line $LV_G(k)$, and $B_{VG}(k)$ denotes an intercept when $L_{VG}(k)$ is extended to $V=V_0$. In addition, $W_T(k)$ and $W_V(k)$ denote the amplitude variabilities at breaking points of the temperature variability and speed variability respectively.

$$K_{TG}(k) = \frac{W_T(k+1) - W_T(k)}{T_G(k+1) - T_G(k)} \quad (8)$$

$$B_{TG}(k) = K_{TG}(k)\{T_0 - T_G(k)\} + W_T(k) \quad (9)$$

$$K_{VG}(k) = \frac{W_V(k+1) - W_V(k)}{V_G(k+1) - V_G(k)} \quad (10)$$

$$B_{VG}(k) = K_{VG}(k)\{V_0 - V_G(k)\} + W_V(k) \quad (11)$$

Next, when the gain GAIN of each wave described in Embodiment 1 is obtained and stored, a gain $GAIN_0$ at reference temperature $T_0$ and reference speed $V_0$ that is obtained by Expression (12) is stored in the volatile adjustment data memory section 12 instead of the gain GAIN obtained by Expression (1). Here, $T_{INIT}$ denotes temperature that is obtained by sampling an output from the temperature sensor 14 when the data of each wave number is obtained. In addition, $K_{TG}(k)$ and $B_{TG}(k)$ denote an inclination and intercept data at such a breaking point that $T_G(k)<T_{INIT}<T_G(k+1)$ holds among k=1 to N. In addition, $V_{INIT}$ denotes lens speed at the time when the data of each wave number is obtained, and $K_{VG}(k)$ and $B_{VG}(k)$ denote an inclination and intercept data at such a breaking point that $V_G(k)<V_{INIT}<V_G(k+1)$ holds among k=1 to N. If the lens speed is controlled to become $V_{INIT}=V_0$, the calculation of the last term in the right side is omissible.

$$GAIN_0 = \frac{\text{RANGE}}{\text{MAX} - \text{MIN}}\{K_{TG}(k)(T_{INIT} - T0) + B_{TG}(k)\}\{K_{VG}(k)(V_{INIT} - V0) + B_{VG}(k)\} \quad (12)$$

The correction processing at the normal operation that uses this adjustment data is performed as follows. The processing comprises the steps of sampling outputs of the MR sensor 2a, obtaining a wave number at a current lens position in the wave counting section 11, and obtaining gain adjustment data $GAIN_0$ in the current wave number from an adjustment data memory section 12. These processing is performed similarly to the case described in Embodiment 1.

Moreover, the processing further comprises the steps of also sampling an output T from the temperature sensor 14 when the outputs from the MR sensor 2a are sampled, and obtaining the moving speed V of the focus lens 1 from target speed or a target position of lens servo-control.

Furthermore, the processing further comprises the steps of obtaining such $K_{TG}(k)$ and $B_{TG}(k)$ that $T_0(k)<T<T_0(k+1)$ may hold, and such $K_{VG}(k)$ and $B_{VG}(k)$ that $V_0(k)<V<V_0(k+1)$ may hold, among k=1 to N from adjustment data, and obtaining a gain GAIN corresponding to T and V by Expression (13).

$$GAIN = \frac{GAIN_0}{\{K_{TG}(k)(T-T0)+B_{TG}(k)\}\{K_{VG}(k)(V-V0)+B_{VG}(k)\}} \quad (13)$$

The gain adjustment and offset adjustment are performed in the gain and offset adjusting section by using the gain GAIN obtained in this manner. Hereinafter, the lens position calculation etc. are executed similarly to that in Embodiment 1.

Figure 13:
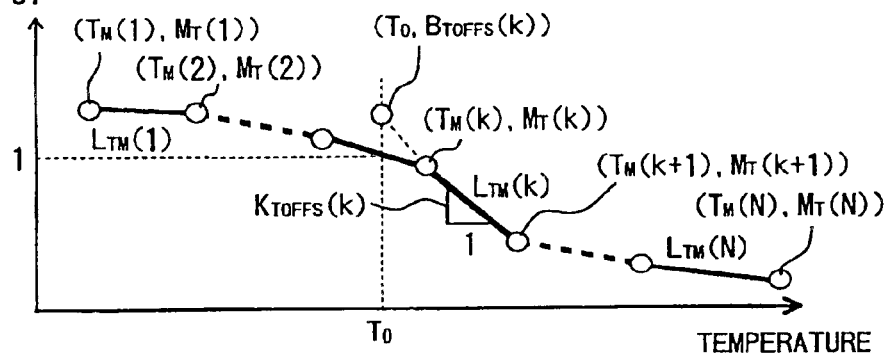
FIG. 13 is a graph showing a curvilinear amplitude center vs. temperature characteristic of an MR sensor output.
Figure 14:
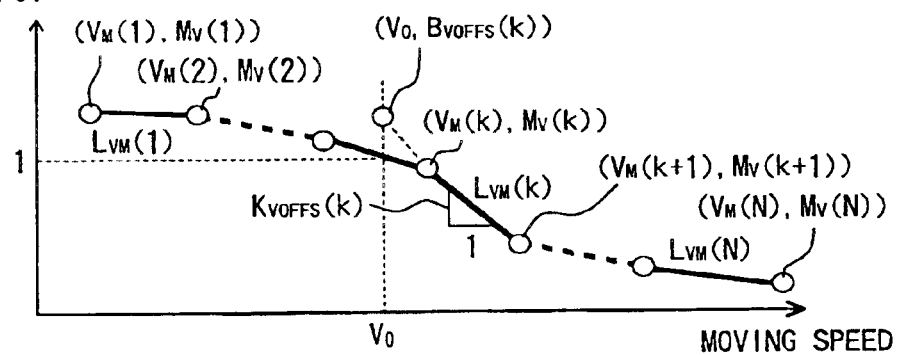
FIG. 14 is a graph showing a curvilinear amplitude center vs. lens moving speed characteristic of an MR sensor output.

In addition, a temperature variability of an amplitude center $M_{V0}$ base on an amplitude center $MT_0$ at the reference temperature $T_0$, and a speed variability of an amplitude center based on an amplitude center at the reference speed $V_0$ are obtained by a sensor characteristic test. Then, they are approximated with polygonal lines $L_{TM}(1)$ to $L_{TM}(N)$, and $L_{VM}(1)$ to $L_{VM}(N)$ as shown in FIGS. 13 and 14 respectively.

On the basis of this data, temperature $T_M(k)$ at a breaking point of the temperature variability of an amplitude center, speed $V_M(k)$ at a breaking point of the velocity variability of amplitude, and data $K_{TOFFS}(k)$, $B_{TOFFS}(k)$, $K_{VOFFS}(k)$, and $B_{VOFFS}(k)$ that are expressed in Expressions (14) to (17) are stored for k=1 to N respectively as adjustment data in the nonvolatile adjustment data memory section 13. Here, $K_{TOFFS}(k)$ [1/° C.] denotes an inclination of a polygonal line $L_{TM}(k)$, and $B_{TOFFS}(k)$ denotes an intercept when $L_{TM}(k)$ is extended to $T=T_0$. In addition, $K_{VOFFS}(k)$ [1/(m/s)] denotes an inclination of a polygonal line $L_{VM}(k)$, and $B_{VOFFS}(k)$ denotes an intercept when $L_{VM}(k)$ is extended to $V=V_0$. Furthermore, $M_T(k)$ and $M_V(k)$ denote the amplitude variabilities at breaking points of the temperature variability and speed variability of amplitude centers respectively.

$$K_{TOFFS}(k) = \frac{M_T(k+1)-M_T(k)}{T_M(k+1)-T_M(k)} \quad (14)$$

$$B_{TOFFS}(k) = K_{TOFFS}(k)\{T_0-T_M(k)\}+M_T(k) \quad (15)$$

$$K_{VOFFS}(k) = \frac{M_V(k+1)-M_V(k)}{V_M(k+1)-V_M(k)} \quad (16)$$

$$B_{VOFFS}(k) = K_{VOFFS}(k)\{V_0-V_M(k)\}+M_V(k) \quad (17)$$

Then, adjustment similar to the case of the gain is performed by using Expression (18) instead of Expression (12) and using Expression (19) instead of Expression (13).

$$OFFSET_0 = \frac{MAX+MIN}{2\{K_{TOFFS}(k)(T_{INIT}-T_0)+B_{TOFFS}(k)\}\{K_{VOFFS}(k)(V_{INIT}-V_0)+B_{VOFFS}(k)\}} \quad (18)$$

$$OFFSET = OFFS_0\{K_{TOFFS}(k)(T-T_0)+B_{TOFFS}(k)\}\{K_{VOFFS}(V-V_0)+B_{VOFFS}(k)\} \quad (19)$$

Owing to the above processing, it becomes possible to perform appropriate adjustment also to the curvilinear fluctuation of the output values of the MR sensor 2a due to a change of environmental temperature and a change of the lens moving speed, that is, to the case that linear approximation is insufficient.

According to each embodiment above described, it becomes possible to perform highly accurate position detection by suppressing accuracy deterioration in position detection that is caused by an event that the gain adjustment and offset adjustment of position detecting signals in a current lens position is not performed adequately, and that arises in conventional technology.

In addition, since the gain adjustment and offset adjustment are adequately performed even when a temperature change arises when the focus lens 1 repeats moving for a long time within one period of a sinusoidal output of the MR sensor 2a or stays for a long time, it becomes possible to perform highly accurate position detection.

Moreover, since the gain adjustment and offset adjustment are adequately performed even when it is not possible to accurately fetch maximum and minimum values of position detecting signals, which are outputs from the MR sensor 2a, at a sampling rate of an A/D converter because of high lens moving speed, it becomes possible to perform highly accurate position detection.

Hence, according to this embodiment, it becomes possible to perform the gain adjustment and offset adjustment with considering influences of an assembly error of a sensor magnet and the like beforehand. Hence, it is possible to provide a position detecting apparatus and a position detecting method that can adequately perform gain adjustment and offset adjustment without receiving an influence of a problem that a gain and an offset disperse by a position of a measuring object in the direction of a measurement axis and can suppress the deterioration in position detection accuracy.

In addition, by obtaining adjustment data corresponding to each wave number in a position detecting signal when a reference position of a focus lens is adjusted, it is possible to obtain the adjustment data that is adjustable at the same time for gain fluctuation and offset fluctuation that are caused by influences of environmental temperature etc. at that time. For example, when the present invention is applied to a video camera etc., this reference position adjustment is performed without fail on power-on and at the switching to a recording mode. Hence, it is possible to obtain appropriate adjustment data corresponding to an operating environment where this position detecting apparatus is installed, and to perform appropriate gain adjustment and offset adjustment.

In addition, the case of detecting a position of the focus lens 1 by using the detecting magnet 2b and MR sensor 2a is described in the above-described Embodiments 1 and 2. Nevertheless, the present invention can be applied to the case of detecting a position of the focus lens 1 by using the optical scale 2d and optical encoder 2c instead of a detecting magnet and an MR sensor as shown in FIG. 2(C).

The optical encoder 2c comprises a light-emitting section and a light-receiving section, and reflects light, emitted from the light-emitting section, by the optical scale 2d to output a signal corresponding to quantity of light detected by the light-receiving section. The optical scale 2d has a reflecting surface whose shape (direction) periodically changes in the direction parallel to an optical axis.

Then, it is possible to generate a sinusoidal signal similar to that of the MR sensor by the shape of this optical scale 2d and the processing of a received light signal from the optical encoder 2c. Therefore, it is possible to apply a position detection method and a gain and offset adjustment method that are similar to the description in Embodiments 1 and 2. Specific processing is the same as those in Embodiments 1 and 2 above described.

(Embodiment 3)

Figure 15:
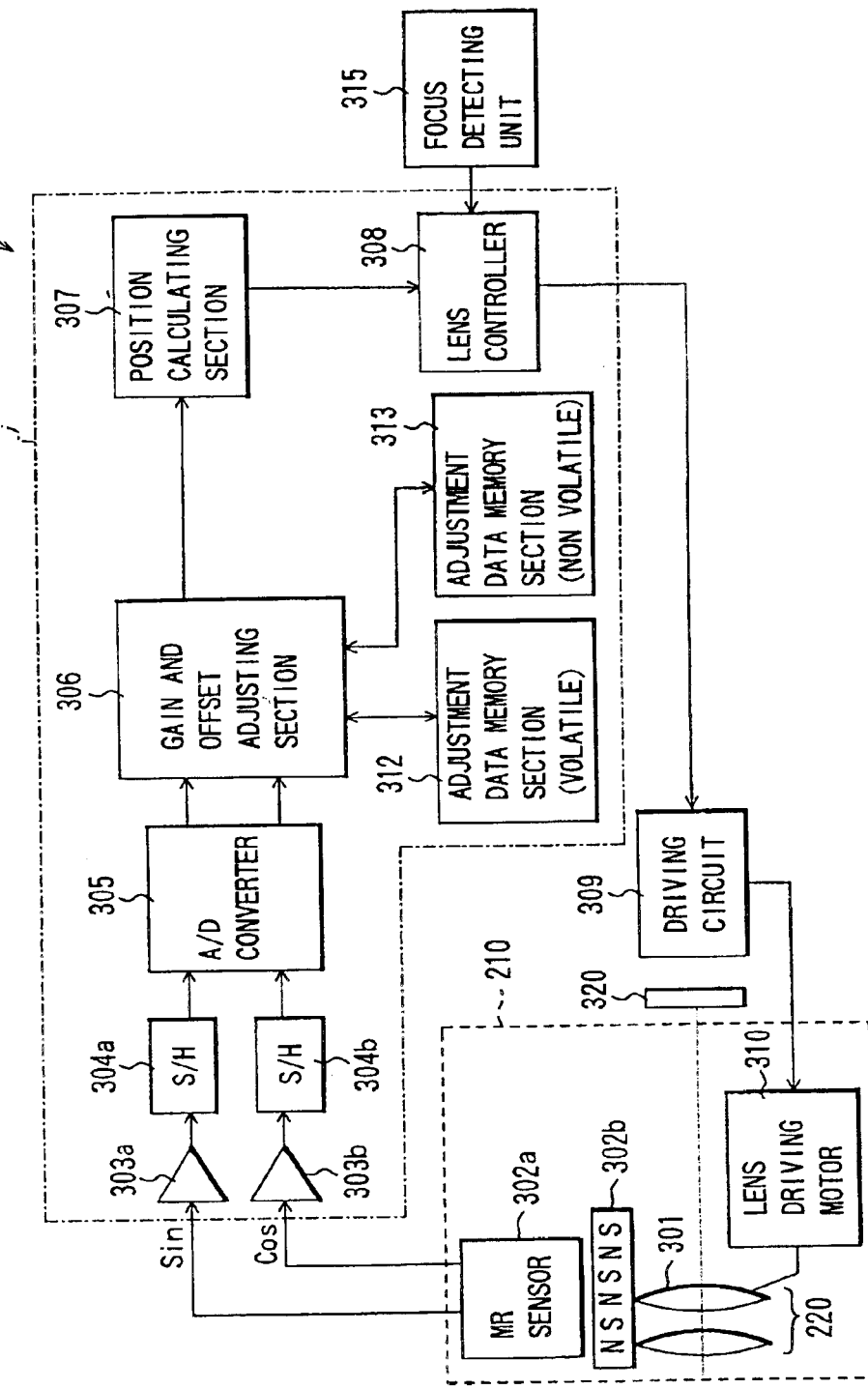
FIG. 15 is a block diagram showing the structure of a camera comprising a position detecting apparatus that is Embodiment 3 of the present invention.

FIG. 15 shows the structure of a camera (optical apparatus) comprising a position detecting apparatus that is Embodiment 3 of the present invention. In addition, though outputs of the MR sensor are made to be two phases, that is, a sine wave and a cosine wave in FIG. 15, the present invention is not limited to this, but it is also good that the MR sensor outputs three or more phases of waves. Furthermore, the present invention is not limited to applications where output signals change sinusoidally like these outputs of the MR sensor, but can be also applied to ones whose output signals change periodically.

In FIG. 15, numerical reference 200 denotes a camera, and numerical reference 210 denotes a lens barrel provided in the camera 200. In addition, the present invention can be applied also to an interchangeable lens system though a camera integrated with a lens barrel is described in this embodiment.

Numerical reference 220 denotes an image pickup optical system provided in the lens barrel 210, and 301 denotes a focus lens (optical element) included in the image pickup optical system 220. This focus lens 301 moves in the direction of an optical axis (cross direction in FIG. 15) since a driving force from a lens driving motor 310 is transmitted through a driving mechanism not shown.

In addition, numerical reference 320 denotes an image pickup device such as a CCD, or a CMOS sensor, and receives a subject image formed by the image pickup optical system 220 and transduces it photoelectrically. A signal output from the image pickup device 320 becomes a picture signal by being given various types of processing by a processing circuit not shown. And, the signal is recorded on a recording medium (tape, semiconductor memory, and optical disk, etc.) not shown, and is displayed in an electronic viewfinder (LCD etc.) not shown. Furthermore, in the camera according to this embodiment, it is possible to set a camera mode for recording a picture signal, obtained from an output signal from the image pickup device 320, in a recording medium, and a playback mode for displaying and outputting an image, having been already recorded in the recording medium, in an electronic view finder (LCD etc.).

Numerical reference 302b denotes a detecting magnet (magnetic member) that moves in the direction of an optical axis with a focus lens 301 integrally. This detecting magnet 302b is magnetized in a specific pattern so as to become a reverse polarity alternately in the direction of the optical axis (the direction of a measurement axis in a position detecting apparatus).

Numerical reference 302a denotes an MR sensor (magnetic detection means), which is arranged with facing the detecting magnet 302b through a predetermined gap. The MR sensor 302a outputs two phases of signals, that is, a sine wave and a cosine wave according to the change of a magnetic field caused by the moving of the detecting magnet 302b interlocking with the focus lens 301.

Two phases of outputs (analog signals) from the MR sensor 302a are amplified respectively by analog amplifiers 303a and 303b, and are converted into digital signals by an A/D converter 305 through sample-hold circuits 304a and 304b.

The MR sensor output digitally converted is inputted into a position calculating section 307 after gains and offsets are adjusted by a gain and offset adjusting section 306. The position calculating section 307 calculates lens position data showing a position of the focus lens 301 on the basis of two phases of input signals (position detecting signals) after these gain and offset adjustment.

The lens position data obtained in this manner is sent to a lens controller 308. The lens controller 308 calculates a position of the focus lens 301, where the focusing of an image pickup optical system 210 is obtained on the basis of the focusing state of the image pickup optical system 210 that is detected by a phase difference detection system etc. in a focus detecting unit 315. Furthermore, the lens controller 308 outputs a control signal for driving the focus lens 301 to a driving circuit 309 so that the lens position data may coincide with a calculated lens position. Then, the driving circuit 309 drives a lens driving motor 310 according to the inputted control signal. Owing to this, the position of the focus lens 301 is controlled by servo toward the focused position. In addition, a control method of the focus lens 301 is not limited to the above-described one.

Numerical reference 312 denotes a volatile adjustment data summary section, which is constituted by volatile memory such as DRAM. This volatile adjustment data memory section 312 stores adjustment data etc. for performing the gain and offset adjustment of outputs of the MR sensor 302a during the operation of the camera (under position detecting operation by the position detecting apparatus), volatilely, that is, so as to be deleted on power-off.

Numerical reference 313 denotes a nonvolatile adjustment data memory section, which is constituted by nonvolatile memory such as EEPROM. This nonvolatile adjustment data memory section 313 stores initial values of adjustment data (initial adjustment data) for performing the gain and offset adjustment of outputs of the MR sensor 302a regardless of whether the camera is operating (under position detecting operation by the position detecting apparatus) or not, nonvolatilely, that is, so as not to be deleted even on power-off.

In addition, the adjustment data stored in the volatile adjustment data memory section 312 and nonvolatile adjustment data memory section 313 may be the values of GAIN and OFFSET shown in Expression (3), or may be the maximum value MAX and minimum value MIN that are shown in Expressions (1) and (2).

The gain and offset adjusting section 306 reads out the adjustment data from the volatile adjustment data memory section 312 or nonvolatile adjustment data memory section 313, and performs the gain and offset adjustment of the MR sensor outputs by applying this to Expression (3), or Expressions (1) to (3) that are above described.

In addition, each component included in an area enclosed by dotted and dashed lines in the diagram is constituted as hardware or software in a camera CPU 205 controlling various functions of the camera 200. However, it is also good to provide the components in a lens CPU controlling various functions of an interchangeable lens apparatus (not shown).

In the state that the camera according to this embodiment is assembled in a factory, predetermined initial values are stored as gain and offset adjustment data in the nonvolatile adjustment data memory section 313. However, these initial values are tentative initial values in which the assembly error of a sensor and the errors of electric characteristics of circuits in an individual product are not reflected. Hence, when the power supply is turned on for the first time after assembly, accurate (true) initial adjustment data is obtained by driving the focus lens 301 as described below.

Figure 16:
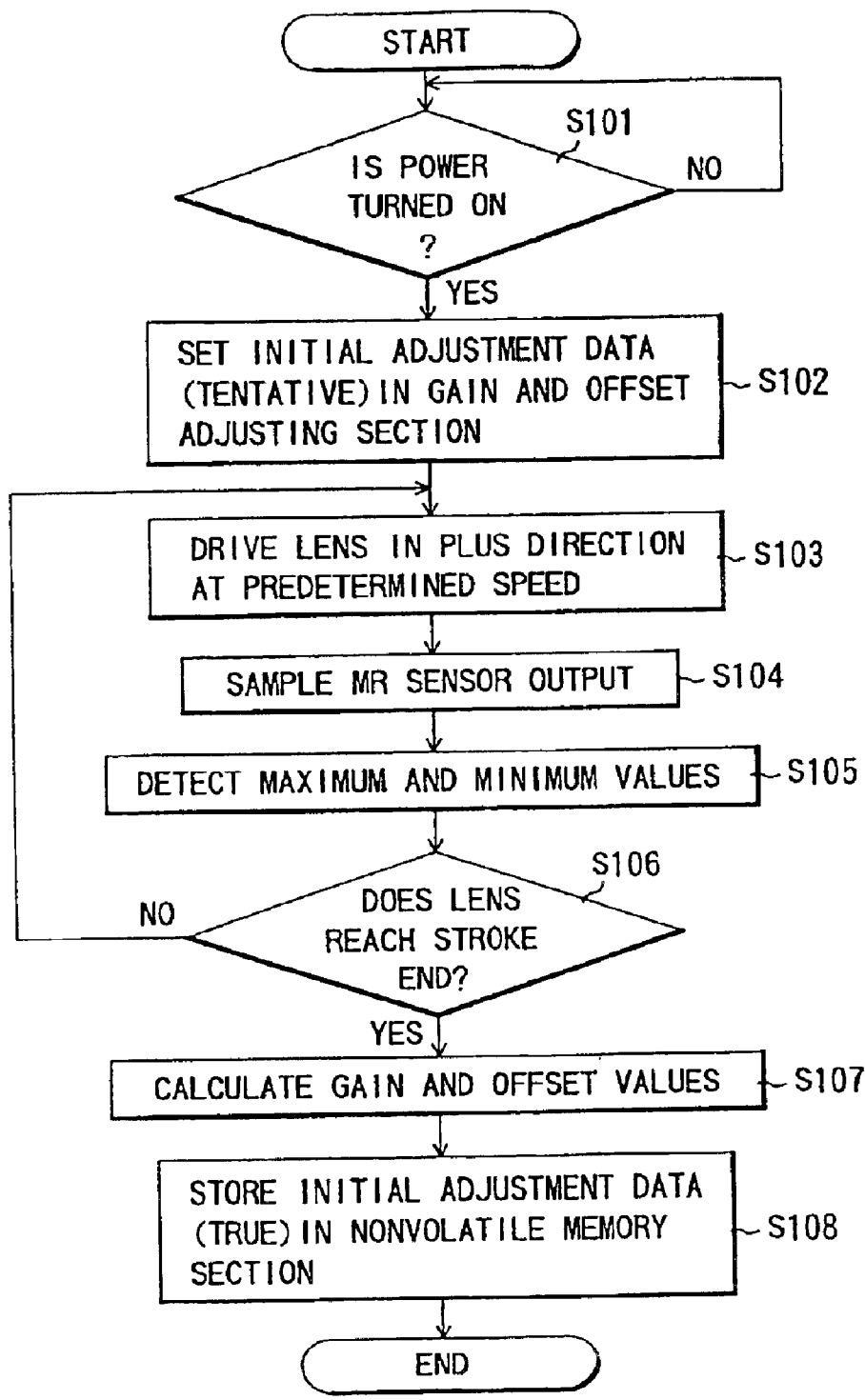
FIG. 16 is a flow chart showing the operation for obtaining initial gain and offset adjustment data of an MR sensor output in the camera according to Embodiment 3.

Namely, as shown in a flow chart in FIG. 16, when the power supply is turned on (step S101), the camera CPU 205 makes the gain and offset adjusting section 306 read the tentative initial adjustment data (gain and offset adjustment data) stored in the nonvolatile adjustment data memory section 313. Then, the camera CPU 205 makes this set as adjustment data in the gain and offset adjusting section 306 (step S102).

Next, at step S103, the camera CPU 205 drives the focus lens 301 from the wide end position automatically set by a power supply in the plus direction (direction of a tele end) at the predetermined speed through the lens controller 308. The driving speed at this time is set at sufficiently low speed so as to be able to surely sample the maximum value MAX and minimum value MIN in a sine wave period. Then, the output from the MR sensor 302a (output from the A/D converter 305) is sampled at each specific period (step S104), and the maximum value and minimum value of the output are detected (step S105).

Next, when it is detected at step S106 that the focus lens 301 reaches a stroke end (here, a tele end), the process proceeds to step S107, and the camera CPU 205 calculates gain offset adjustment data (the gain GAIN and offset OFFSET) is from the maximum value and minimum value of the sensor output detected at step 105 (step S107).

Then, the camera CPU 205 makes the nonvolatile adjustment data memory section 313 store the obtained adjustment data as true initial adjustment data (step S108). Owing to this, the accurate (true) initial adjustment data corresponding to an individual product has been stored in the nonvolatile adjustment data memory section 313. In addition, when the maximum value MAX and minimum value MIN are used as adjustment data, step S107 is skipped, and these values are stored in the volatile adjustment data memory section 312 at step S108 as it is.

Furthermore, it is good to perform the storage of this initial adjustment data into the nonvolatile adjustment data memory section 313 only once on power-on immediately after assembly in a factory. Alternatively, it is also good to update the storage of the initial adjustment data by performing the storage each time the lens system is reset thereafter. Here, the reset of a lens system means the initializing operation of the system that relates to lens drive when the power is turned on in a camera mode and when a mode is switched from a playback mode to a camera.

Figure 17:
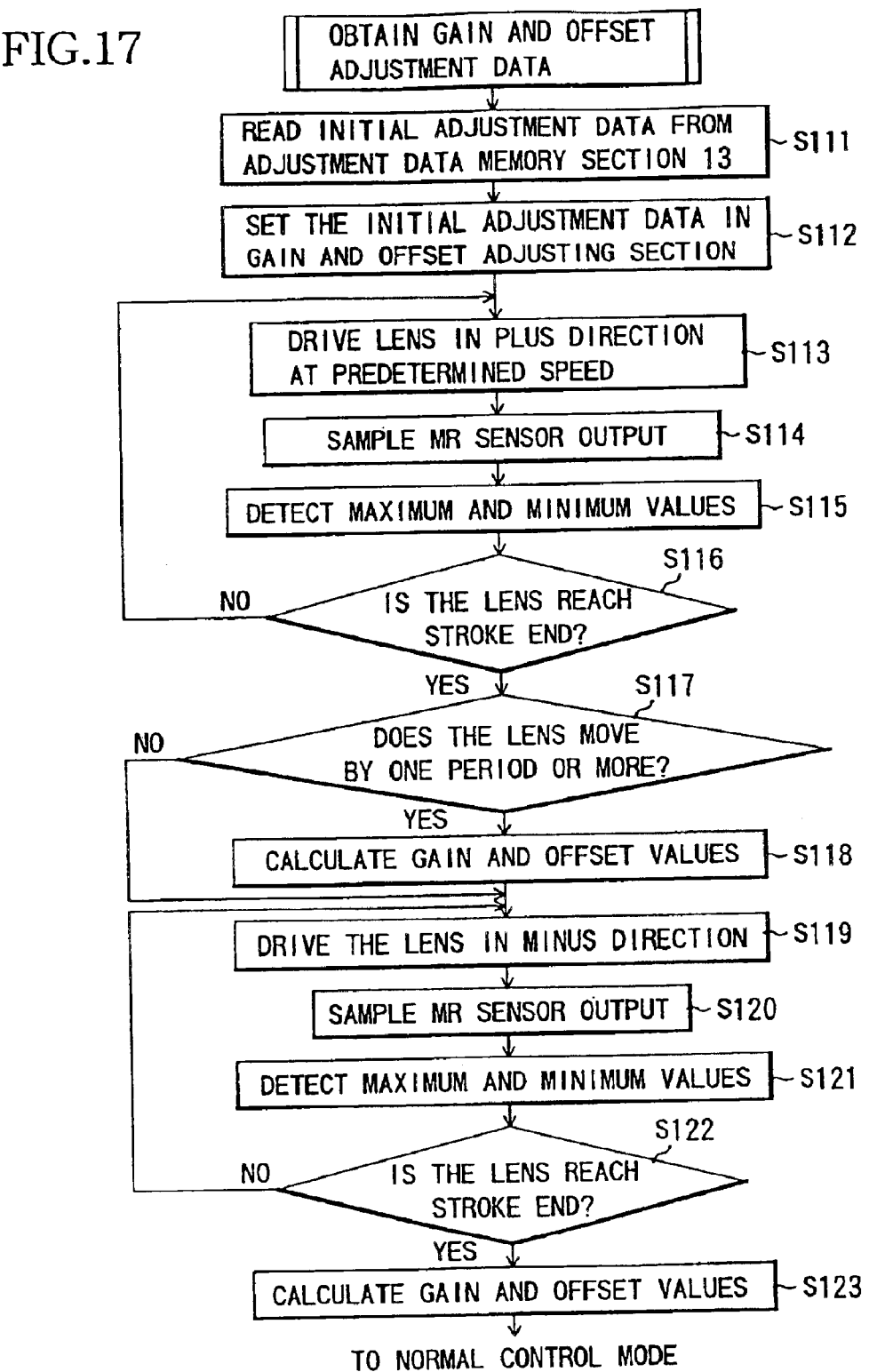
FIG. 17 is a flow chart showing the operation for obtaining gain and offset adjustment data of an MR sensor output in the camera according to Embodiment 3.

Next, the processing of the gain and offset adjusting section 306 will be described according to a flow chart shown in FIG. 17 that obtains gain and offset adjustment data of the MR sensor 302a (here, GAIN and OFFSET) in this operation in the state that the adjustment data, corresponding to an individual product, has been already stored in the nonvolatile adjustment data memory section 313 (namely, the state that the adjustment data having been obtained in the past operation is stored in the nonvolatile adjustment data memory section 313). This processing is executed at the time of power-on or the reset of the lens system. In addition, the following processing is performed for each of plural phases of output from the MR sensor 302a.

Firstly, at step S111, the camera CPU 205 makes the gain and offset adjusting section 306 read the initial adjustment data which corresponds to an individual product and is stored in the nonvolatile adjustment data memory section 313.

Next, at step S112, the camera CPU 205 makes the gain and offset adjusting section 6 set the read initial adjustment data as adjustment data to apply the adjustment data to the gain and offset adjustment.

Then, at step S113, the camera CPU 205 makes the lens controller 308 output a signal of driving the focus lens 301 in the plus direction at predetermined speed to the driving circuit 309. As above described, the driving speed at this time is set at sufficiently low speed so as to be able to surely sample the maximum value MAX and minimum value MIN in a sine wave period.

Then, at steps S114 to S115, the camera CPU 205 detects the maximum and minimum values of outputs of the MR sensor 302a while the focus lens 301 moves. Moreover, the camera CPU 205 determines whether the focus lens 301 reaches a stroke end at step S116. Here, it is also good either to detect by an optical sensor etc. whether the focus lens reaches the stroke end, or to determine whether a predetermined time has elapsed from driving start. The process needs to step S117 when the lens reaches the stroke end (tele end).

At step S117, the camera CPU 205 determines whether the focus lens 301 has moved by one period or more of a sine wave output of the MR sensor 302a. When the focus lens 301 reaches the stroke end, the camera CPU 205 calculates gain and offset adjustment data from the detected maximum and minimum values at step S118, and makes the volatile adjustment data memory section 312 store the calculation result (when the maximum value MAX and minimum value MIN are used as adjustment data, these values are made to be stored in the volatile adjustment data memory-section 312 as it is). After this, the gain and offset adjusting section 306 performs the gain and offset adjustment by using the adjustment data stored here.

On the other hand, when the focus lens 301 does not move less than one period at step S117, neither the maximum value nor the minimum value of the sine wave output have been obtained yet. Hence, the process proceeds to step S119 without calculating the gain and offset adjustment data.

At step S119, so as to return the focus lens 301 to the reference position (for example, wide end), the camera CPU 205 makes the lens controller 308 send a signal of driving the focus lens in the minus direction at predetermined speed to the driving circuit 309. Then, the maximum and minimum values of outputs of the MR sensor 302a are detected at step S120 to S121 also while the focus lens 301 at this time moves. Then, the camera CPU 205 determines at step S122 whether the focus lens 301 reaches the stroke end (wide end) that is a reference position. If reaching, the process proceeds to step S123, where the camera CPU 205 calculates the gain and offset adjustment data from the maximum and minimum values detected at step S121 to make the volatile adjustment data memory section 312 store the result. After this, the gain and offset adjusting section 306 performs the gain and offset adjustment by using the adjustment data stored here.

It is also good either to detect whether the focus lens 301 has reached the reference position by an optical sensor etc., or to determine whether a predetermined time has elapsed from driving start. Hereinabove, the gain and offset processing on the lens reset is completed, and a mode shifts to a normal control mode.

Owing to the above processing, the accurate gain offset adjustment data is stored in the volatile adjustment data memory section 312, and the gain and offset adjusting section 306 accurately executes the gain and offset adjustment of outputs of the MR sensor 302a.

In addition, in the above description, the calculation of the gain and offset adjustment data is performed only when the focus lens 301 reaches the stroke end. Nevertheless, as another embodiment, it is also good to calculate the gain and offset adjustment data each time the outputs of the MR sensor 302a change by one period or more while the focus lens 301 is driven at predetermined speed, and to update the adjustment data, which has been already stored in the volatile adjustment data memory section 312, with the calculated adjustment data. If this is adopted, since the adjustment data is updated at any time while the focus lens 301 is moving, it is possible to make the control of the focus lens 301 be accurate and stable at an earlier stage.

(Embodiment 4)

Figure 18:
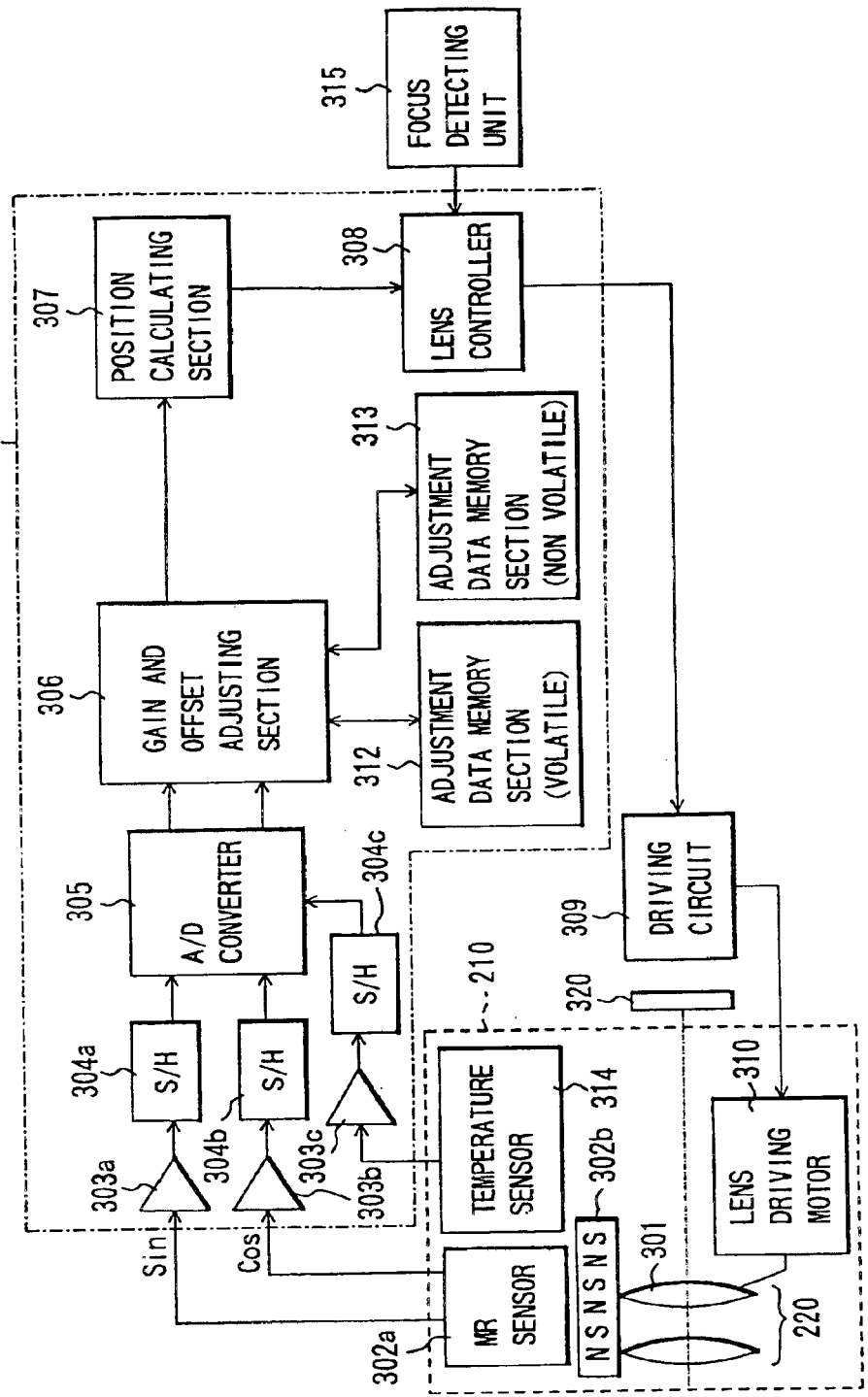
FIG. 18 is a block diagram showing the structure of a camera comprising a position detecting apparatus that is Embodiment 4 of the present invention.

FIG. 18 shows the structure of a camera comprising a position detecting apparatus that is Embodiment 4 of the present invention. This embodiment is different from embodiment 3 in the respect that this embodiment comprises a temperature sensor 314 and components related to this. The same numerical references are assigned in this embodiment to components common to those in Embodiment 3.

The temperature sensor 314 is provided in the vicinity of the MR sensor 302a and detecting magnet 302b, and detects the ambient temperature of the MR sensor 302a and detecting magnet 302b. An output (analog signal) from the temperature sensor 314 is amplified by an analog amplifier 303c provided in a camera CPU 205' and is converted digitally by an A/D converter 305 through a sample-hold circuit 304c to be inputted into the gain and offset adjusting section 306.

In addition, when the camera 200 according to this embodiment has a function of correction of defocus due to temperature, namely, correcting a focusing position of the focus lens 301, which is calculated on the basis of data from a focus detecting unit 315, according to temperature, and suppressing focus point fluctuation due to the deformation of an image pickup optical system 220 and a mechanical member supporting this that is caused by a temperature change, it is also possible to use this temperature sensor 314 as a temperature sensor for correcting the defocusing. Owing to this, it is possible to reduce cost in comparison with the case that the temperature sensor 314 is provided independently of a temperature sensor for defocus correction, and, it is also possible to miniaturize a camera.

The processing of obtaining initial adjustment data (GAIN and OFFET, or MAX and MIN) used for gain and offset adjustment on the first power-on after the camera according to this embodiment is assembled at a factory is the same as that in Embodiment 3. However, in this embodiment, the camera CPU 205' makes the nonvolatile adjustment data memory section 313 store the variability data of gains and offsets to a temperature change of the MR sensor 302a in addition to this initial adjustment data. This variability data will be described later. In addition, the camera CPU 205' makes the nonvolatile adjustment data memory section 313 store the temperature data detected by the temperature sensor 314.

Furthermore, also in this embodiment as well as Embodiment 3, it is good to perform the storage of this initial adjustment data into the nonvolatile adjustment data memory section 313 only once on power-on immediately after assembly in a factory. Alternatively, it is also good to update the storage each time new adjustment data is obtained by the lens system being reset thereafter.

Figure 19:
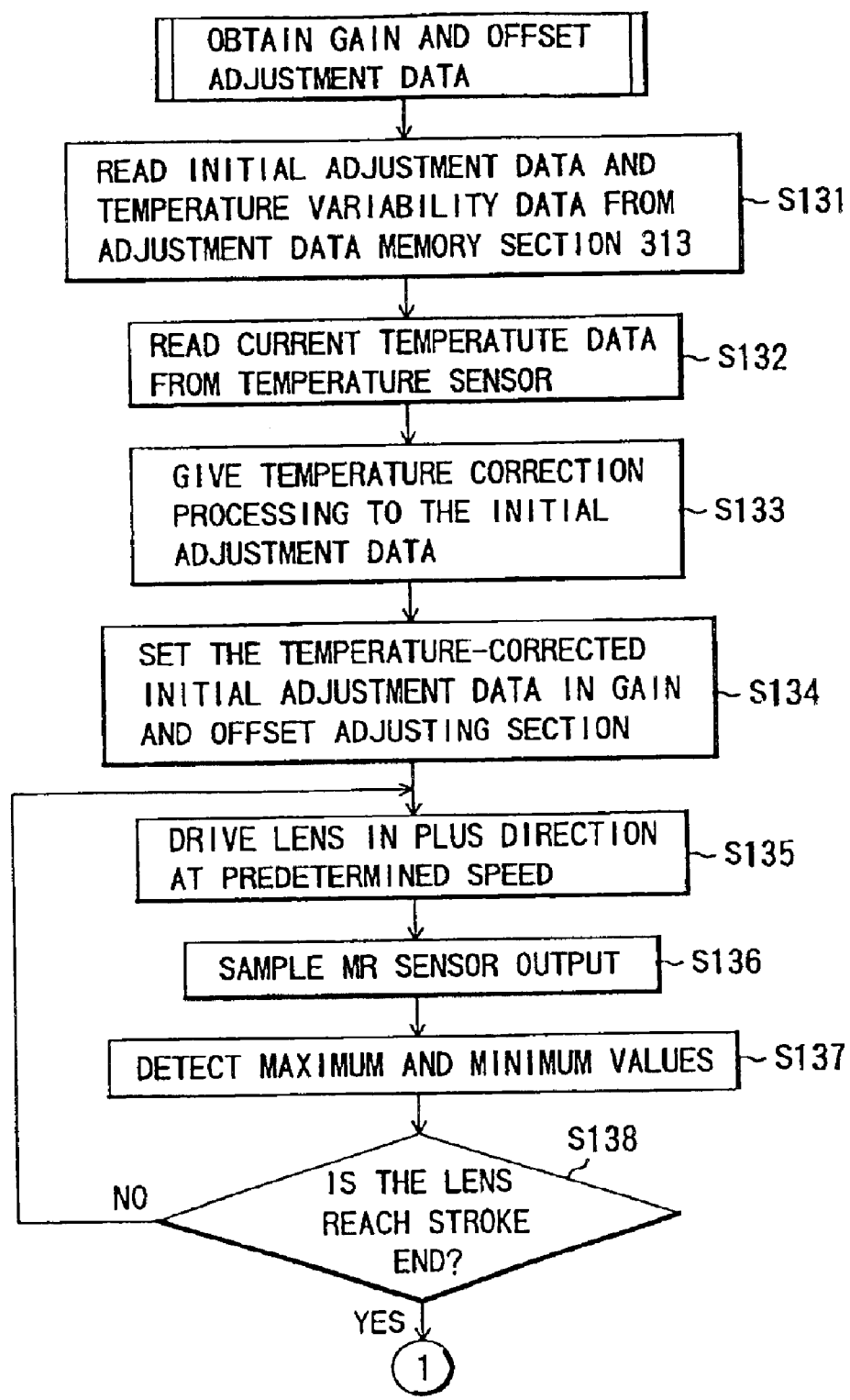
FIG. 19 is a flow chart showing the operation for obtaining gain and offset adjustment data of an MR sensor output in the camera according to Embodiment 4.
Figure 19:
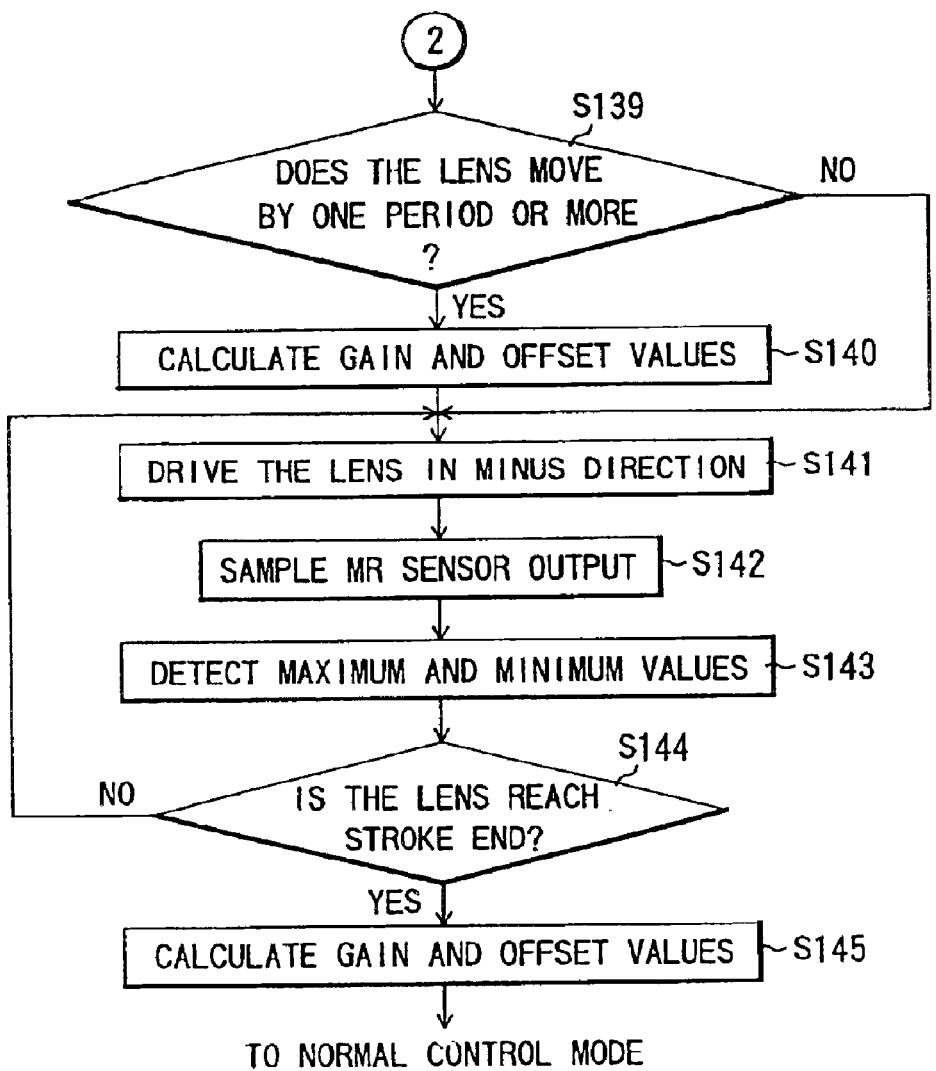

Hereinafter, the processing of obtaining gain and offset adjustment data (here, GAIN and OFFSET) of the MR sensor 302a in the state that the nonvolatile adjustment data memory section 313 has already stored the initial adjustment data will be described according to a flow chart shown in FIG. 19. This processing is executed on power-on in a mode or on the reset of the lens system.

First of all, at step S131, the camera CPU 205' makes the initial adjustment data (true initial adjustment data) that corresponds to an individual product and is stored in the nonvolatile adjustment data memory section 313, temperature data having been detected by the temperature sensor 314 when the initial adjustment data was calculated, and the variability data of gains and offsets to the temperature change of the MR sensor 302a read from the nonvolatile adjustment data memory section 313. Next, at step S132, the camera CPU 205' makes present temperature data, which is detected by the temperature sensor 314, read.

Then, at step S133, the camera CPU 205' makes the gain and offset adjusting section 306 give temperature correction processing (this will be described later) to the initial adjustment data read from the nonvolatile adjustment data memory section 313. Next, at step S134, the camera CPU 205' makes the gain and offset adjusting section 306 perform the gain and offset adjustment at step S135 and subsequent steps that uses the temperature-corrected initial adjustment data. The processing at step S135 and the subsequent steps is similar to the processing in step S113 and the subsequent steps described in Embodiment 3 (FIG. 17).

Next, the temperature correction processing executed at step S133 will be described. Nevertheless, since contents of the temperature correction processing of gain adjustment data and offset adjustment data are almost common, here, the temperature correction processing of the gain adjustment data will be described in detail, and the temperature correction processing of the offset adjustment data will be described only for unique portions.

Figure 20:
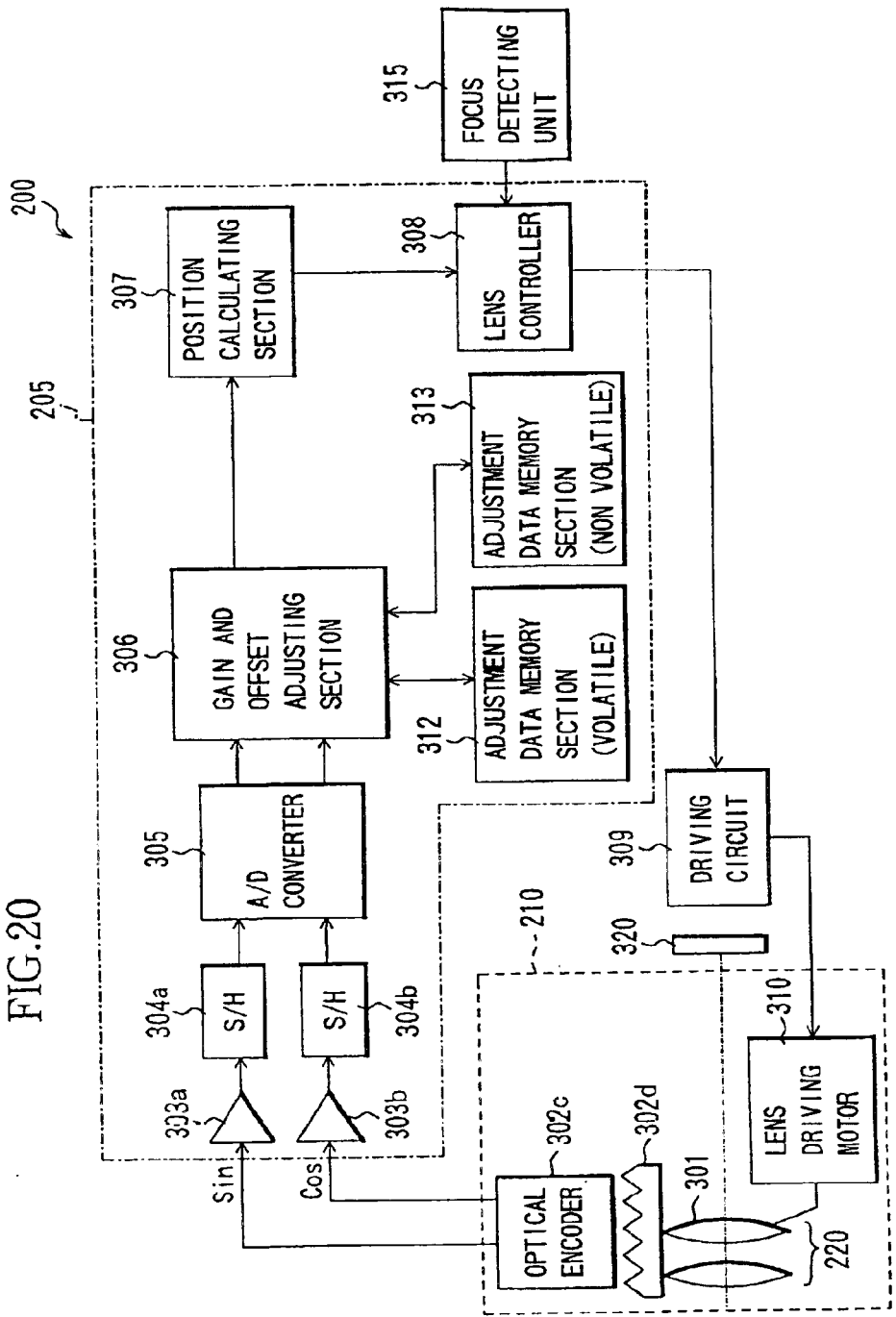
FIG. 20 is a block diagram showing the structure of a camera comprising a position detecting apparatus that is Embodiment 5 of the present invention.

Firstly, the temperature correction processing of the gain adjustment data in the case that it is assumed that the output amplitude (MAX−MIN) of the MR sensor 302a linearly changes to temperature as shown in FIG. 20 will be described.

As the gain variability data, an inclination $K_{TG}$ [1/° C.] of a temperature variability of amplitude based on the output amplitude of the MR sensor 302a at the reference temperature $T_0$ that is shown in FIG. 9 and is used in the description of Embodiment 2 is obtained beforehand by a sensor characteristic test to be stored in the nonvolatile adjustment data memory section 313. In addition, a gain $GAIN_0$ at the reference temperature $T_0$ that is obtained by the following expression (20) is stored in the nonvolatile adjustment data memory section 313 as the initial adjustment data of a gain differently from Embodiment 3 instead of the gain GAIN obtained by the above-described Expression (1). Here, $T_{INIT}$ denotes temperature data that is detected by the temperature sensor 314 at the time of the calculation of the initial adjustment data performed when the power is turning on or the lens system is reset.

$$GAIN_0 = \frac{RANGE}{MAX - MIN}\{1 + K_{TG}(T_{INIT} - T_0)\} \tag{20}$$

The temperature correction processing at step S133 that uses this gain variability data is performed as follows. Namely, the initial adjustment data GAIN after the temperature correction is obtained by Expression (21) by using the initial adjustment data $GAIN_0$ and variability data $K_{TG}$ showing an inclination of the temperature variability of amplitude that are read from the nonvolatile adjustment data memory section 313 in step S131, and a current temperature sensor value T read at step S132.

$$GAIN = \frac{GAIN_0}{1 + K_{TG}(T - T_0)} \tag{21}$$

In addition, as the offset adjustment data, similar temperature correction processing is performed by using Expression (22) instead of Expression (20), and Expression (23) instead of Expression (21) (namely, the offset adjustment data OFFSET of temperature correction V is obtained). Here, $K_{TOFFS}$ [1/° C.] denotes an inclination of the temperature variability of an amplitude center based on an amplitude center of the MR sensor 32a at the reference temperature $T_0$ as shown in FIG. 10, and is stored in the nonvolatile adjustment data memory section 313 after being obtained in the sensor characteristic test.

$$OFFSET_0 = \frac{MAX + MIN}{2\{1 + K_{TOFFS}(T_{INIT} - T_0)\}} \quad (22)$$

$$OFFSET = OFFSET_0\{1+K_{TOFFS}(T-T_0)\} \quad (23)$$

The temperature correction is applied to the initial adjustment data stored in the nonvolatile adjustment data memory section 313 by performing the processing shown in step S135 and subsequent steps by using the GAIN and OFFSET obtained in this manner as the initial adjustment data. Hence, it is possible to perform the more stable servo control of the focus lens 301.

In the above description, the adjusting method in the case that it is approximated that the output amplitude (MAX–MIN) of the MR sensor 302a linearly changes to temperature is described. Nevertheless, depending on characteristics of the MR sensor 302a and amplifier circuits 303a to 303c, etc., the output amplitude of the MR sensor 302a curvilinearly changes to the temperature. Hence, it may be supposed that the linear approximation is insufficient. Then, a gain adjusting method in such a case will be described.

First of all, the temperature variability of amplitude based on the output amplitude of the MR sensor 302a at the reference temperature $T_0$ is obtained by a sensor characteristic test, and is approximated with polygonal lines $L_{TG}(1)$ to $L_{TG}(N)$ as shown in FIG. 11.

On the basis of this data, temperature $T_G(k)$ at a breaking point of the data, and data of $K_{TG}(k)$ and $B_{TG}(k)$ that are expressed in Expressions (24) to (25) are stored for k=1 to N respectively as gain variability data in the nonvolatile adjustment data memory section 313. Here, $K_{TG}(k)$ [1/° C.] denotes an inclination of a polygonal line $L_{TG}(k)$, and $B_{TG}(k)$ denotes an intercept when $L_{TG}(k)$ is extended to $T=T_0$. In addition, $W_T(k)$ denotes an amplitude variability at a breaking point of the temperature variability of output amplitude of the MR sensor 302a.

$$K_{TG}(k) = \frac{W_T(k+1) - W_T(k)}{T_G(k+1) - T_G(k)} \quad (24)$$

$$B_{TG}(k) = K_{TG}(k)\{T_0 - T_G(k)\} + W_T(k) \quad (25)$$

A gain $GAIN_0$ at the reference temperature $T_0$ that is obtained by Expression (26) is stored in the nonvolatile adjustment data memory section 313 as the initial adjustment data instead of the gain GAIN obtained by Expression (1). Here, $T_{INIT}$ denotes temperature data that is detected by the temperature sensor 314 at the time of obtaining the initial adjustment data. In addition, $K_{TG}(k)$ denotes the data of an inclination and an intercept at such a breaking point that $T_G(k)<T_{INIT}<T_G(k+1)$ holds among k=1 to N.

$$GAIN_0 = \frac{RANGE}{MAX - MIN}\{K_{TG}(k)(T_{INIT} - T0) + B_{TG}(k)\} \quad (26)$$

The correction processing at step S133 that uses this variability data is performed as follows. Namely, the initial adjustment data GAIN after the temperature correction is obtained by Expression (27) by using the initial adjustment data $GAIN_0$ read from the nonvolatile adjustment data memory section 313 at step S131, a current temperature sensor value T read at step S132, and such $K_{TG}(k)$ and $B_{TG}(k)$ that $T_0(k)<T<T_0(k+1)$ holds among k=1 to N in the temperature correction data read at step S131.

$$GAIN = \frac{GAIN_0}{K_{TG}(k)(T - T0) + B_{TG}(k)} \quad (27)$$

In addition, as for the offset, the temperature variability of an amplitude center based on the amplitude center $M_T(0)$ at the reference temperature $T_0$ is obtained by a sensor characteristic test, and is approximated with polygonal lines $L_{TM}(1)$ to $L_{TM}(N)$ as shown in FIG. 13. On the basis of this variability data, temperature $T_M(k)$ at a breaking point of the temperature variability of an amplitude center, and data of $K_{TOFFS}(k)$ and $B_{TOFFS}(k)$ that are expressed in Expressions (12) to (13) are stored for k=1 to N respectively as the initial adjustment data in the nonvolatile adjustment data memory section 313. Here, $K_{TOFFS}(k)$ [1/° C.] denotes an inclination of a polygonal line $L_{TM}(k)$, and $B_{TOFFS}(k)$ denotes an intercept when $L_{TM}(k)$ is extended to $T=T_0$. In addition, $M_T(k)$ denotes an amplitude variability at a breaking point of the temperature variability of the amplitude center.

$$K_{TOFFS}(k) = \frac{M_T(k+1) - M_T(k)}{T_M(k+1) - T_M(k)} \quad (28)$$

$$B_{TOFFS}(k) = K_{TOFFS}(k)\{T_0 - T_M(k)\} + M_T(k) \quad (29)$$

Then, temperature correction similar to the case of the gain is performed by using Expression (30) instead of Expression (26) and using Expression (31) instead of Expression (27).

$$OFFSET_0 = \frac{MAX + MIN}{2\{K_{TOFFS}(k)(T_{INIT} - T_0) + B_{TOFFS}(k)\}} \quad (30)$$

$$OFFSET = OFFSET_0\{K_{TOFFS}(k)(T-T_0)+B_{TOFFS}(k)\} \quad (31)$$

Owing to the above processing, it becomes possible to perform appropriate temperature correction of the initial adjustment data also to the case that linear approximation is insufficient because of the curvilinear fluctuation of the MR sensor output due to a temperature change.

(Embodiments 5 and 6)

Figure 21:
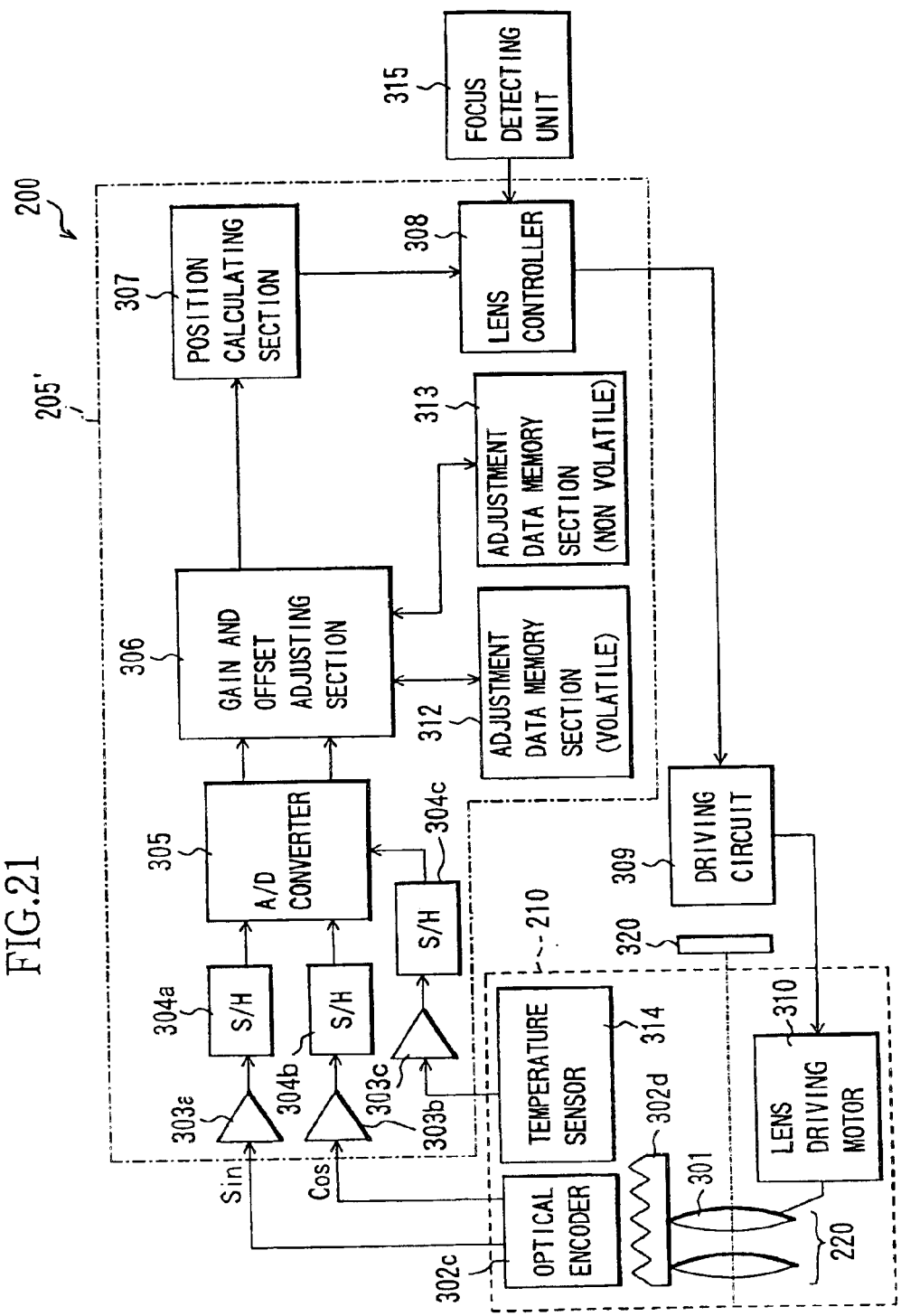
FIG. 21 is a block diagram showing the structure of a camera comprising a position detecting apparatus that is Embodiment 6 of the present invention.
Figure 22:
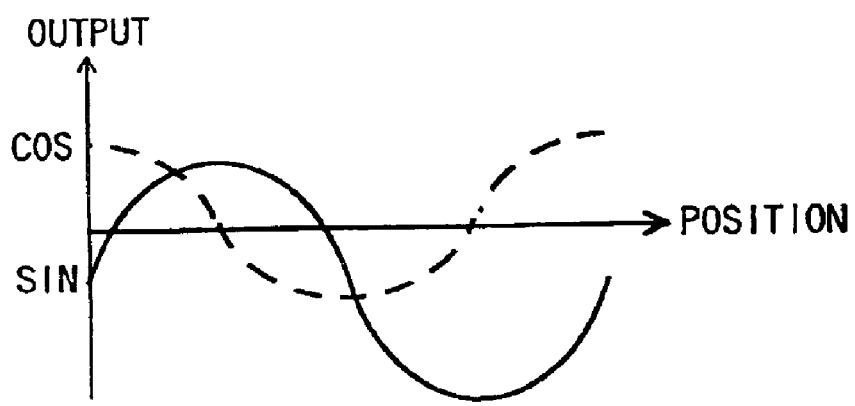
FIG. 22 is a graph showing a state that the amplitude and levels of amplitude centers of two phases of output signals from an MR sensor are different.
Figure 23:
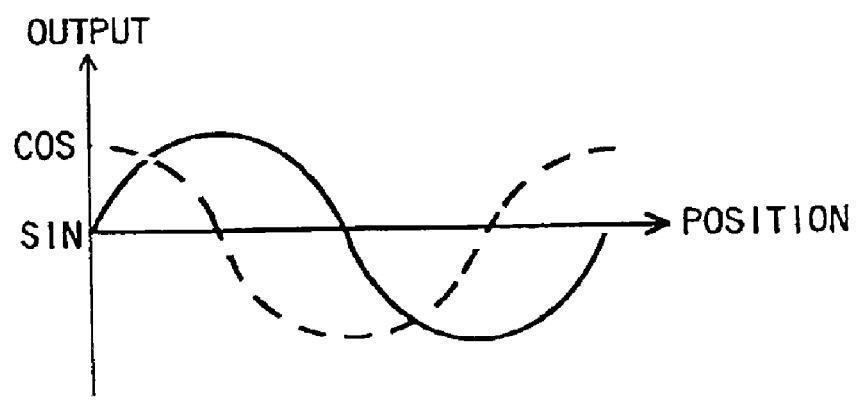
FIG. 23 is a graph showing a state that the amplitude and levels of amplitude centers of two phases of output signals from an MR sensor become in similar levels respectively.
Figure 24:
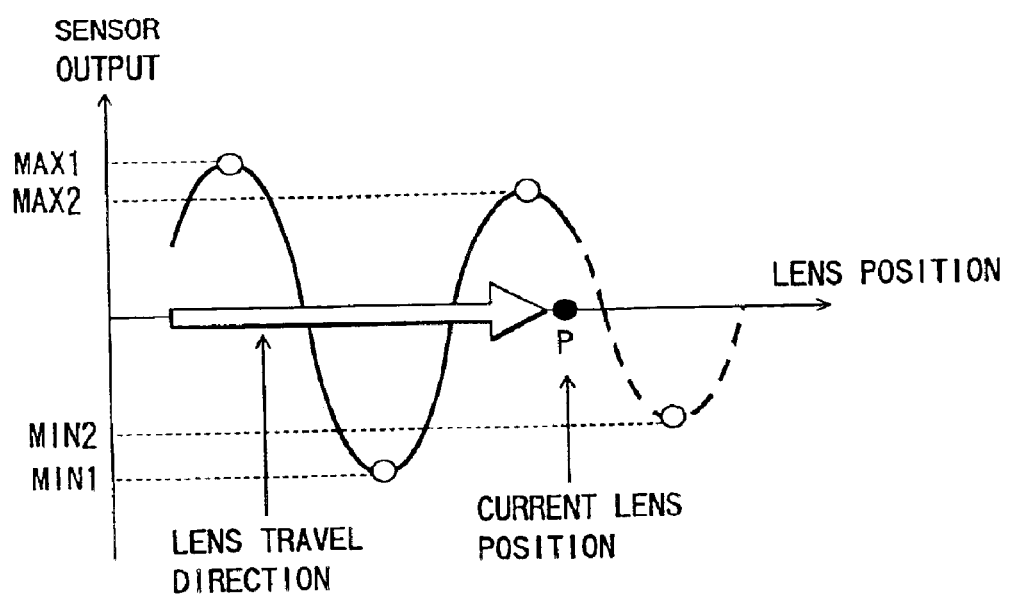
FIG. 24 is a graph showing the relation between the adjustment data and the period of an MR sensor output that are obtained in prior art.
Figure 25:
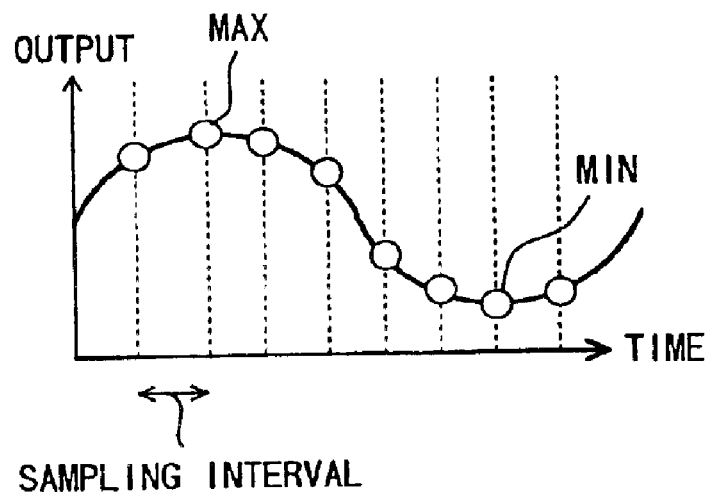
FIG. 25 is a graph showing a state that maximum and minimum values of an MR sensor output are correctly sampled.
Figure 26:
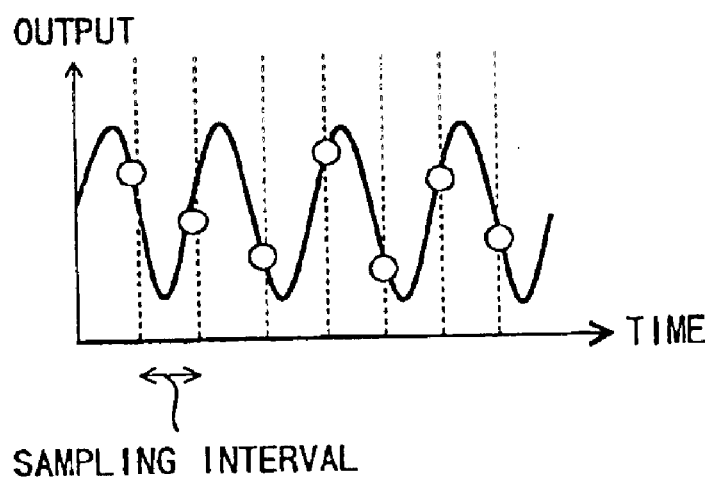
FIG. 26 is a graph showing a state that maximum and minimum values of an MR sensor output are not correctly sampled.

FIGS. 20 and 21 show the structure of cameras comprising respectively position detecting apparatuses that are Embodiments 5 and 6 of the present invention. Each of these comprises an optical scale 302d and an optical encoder 302c instead of the detecting magnet 302b and MR sensor 302a in the above-described Embodiments 3 and 4 as a sensor that detects a position of the focus lens 301.

The optical encoder 302c comprises a light-emitting section and a light-receiving section, and reflects light, emitted from the light-emitting section, by the optical scale 302d to output a signal corresponding to quantity of light detected by the light-receiving section. The optical scale 302d has a reflecting surface whose shape (direction) periodically changes in the direction parallel to an optical axis.

Then, it is possible to generate a sinusoidal signal similar to that of the MR sensor by the shape of this optical scale 302d and the processing of a received light signal from the optical encoder 302c. Therefore, it is possible to apply a position detection method and a gain and offset adjustment method that are similar to the description in Embodiments 3 and 4.

Specific processing is the same as those in Embodiments 3 and 4 above described, its description is omitted.

As above described, gains and offsets of outputs of an MR sensor and a sensor such as an optical encoder vary by assembly errors of sensors, errors of circuits, thermal characteristic changes of the sensors, and the like in individual products. Nevertheless, the assembly errors of the sensors and the errors of electric characteristics of circuits hardly vary in the same individual among these. Hence, by storing the adjustment data, detected at the time of the past energised operation, in a nonvolatile adjustment data memory section and performing the gain and offset adjustment by using this stored adjustment data (GAIN and OFFSET, or MAX and MIN) immediately after power-on or a system reset, it is possible to stably control an object from immediately after power-on or the start of a system reset. Therefore, it is possible to surely sample the maximum and minimum values of a sensor output by driving the object meanwhile at sufficiently low speed. Owing to this, it is possible to obtain the gain and offset adjustment data without making the object perform extra reciprocation. In other words, it is possible to shorten the time when stable control can be performed after the power-on or the start of a system reset.

Moreover, by detecting the temperature around the sensor and correcting the fluctuation of the initial adjustment data due to the temperature on the basis of the detected temperature and the gain and offset variability data to the temperature change that is stored in the nonvolatile adjustment data memory section, it is possible to stably control the object even when the power is turned on or the system is reset under environmental temperature different from the temperature at the time when the adjustment data on the past energized operation was stored in the nonvolatile adjustment data memory section.

In addition, though the position detection of a focus lens included in an image pickup optical system of a camera is described in each of the above-described embodiments, the present invention can be also applied to an apparatus performing the position detections of a movable optical element except the focus lens (for example, a zoom lens) or a movable object except the optical element.

While preferred embodiments have been described, it is to be understood that modification and variation of the present invention may be made without departing from the spirit or scope of the following claims.

What is claimed is:

1. A position detecting apparatus that detects a position of an object, comprising:
   a position sensor that outputs at least two-phases of position detecting signals that change periodically or sinusoidally according to movement of the object;
   a signal adjusting unit that performs gain and offset adjustment of each of the position detecting signals by using adjustment data;
   a calculation unit that obtains a position of the object on the basis of the position detecting signals whose gains and offsets are adjusted;
   a counter that counts a wave number of the position detecting signals from a reference position; and
   a memory circuit that stores adjustment data corresponding to the wave number,
   wherein the signal adjusting unit adjusts gains and offsets of the position detecting signals on the basis of the adjustment data corresponding to the wave number that is counted by the counter and is stored in the memory circuit.

2. The position detecting apparatus according to claim 1, further comprising a variability memory circuit storing gain and offset variability data of the position detecting signals corresponding to moving speed of the object,
   wherein the signal adjusting unit detects moving speed of the object and adjusts gains and offsets of the position detecting signals on the basis of variability data that is stored in the variability memory circuit and corresponds to the detected moving speed, and adjustment data corresponding to a wave number that is counted by the counter.

3. The position detecting apparatus according to claim 1, further comprising:
   a temperature detector detecting ambient temperature of the position sensor; and
   a variability memory circuit storing gain and offset variability data of the position detecting signals corresponding to temperature,
   wherein the signal adjusting unit adjusts gains and offsets of the position detecting signals on the basis of variability data that is stored in the memory circuit and corresponds to temperature detected by the temperature detector, and adjustment data corresponding to a wave number that is counted by the counter.

4. The position detecting apparatus according to claim 1, wherein adjustment data corresponding to the wave number is obtained when the reference position of the object is adjusted, and is stored in the memory circuit.

5. The position detecting apparatus according to claim 1, wherein the memory circuit is volatile memory.

6. The position detecting apparatus according to claim 1, wherein the position sensor comprises a magnetic member periodically magnetized, and a magnetic detector that relatively moves with the magnetic member in connection with movement of the object and outputs at least two phases of position detecting signals that change periodically or sinusoidally according to a magnetic change due to the movement of the object.

7. The position detecting apparatus according to claim 1, wherein the position sensor comprises an optical scale member having a reflecting surface whose shape periodically changes, and an optical detector that relatively moves with the optical scale member in connection with movement of the object and outputs at least two phases of position detecting signals that change periodically or sinusoidally according to quantity of received light from light reflected on the optical scale member, which changes due to the movement, among light projected to the optical scale.

8. An optical apparatus comprising:
   an optical system; and
   the position detecting apparatus according to claim 1 that detects a position of at least one optical element in the optical system.

9. The optical apparatus according to claim 8, further comprising:
   a control unit controlling defocus correction of the optical system in connection with a temperature change,
   wherein an output of the temperature detector is also used for control of the defocus correction.

10. A position detecting method of adjusting gains and offsets of at least two phases of position detecting signals that change periodically or sinusoidally and are outputted from a position sensor according to movement of an object, and obtaining a position of the object on the basis of the position detecting signals whose gains and offsets are adjusted, comprising:

a step of counting a wave number of the position detecting signals from a reference position;

a step of obtaining adjustment data corresponding to the wave number that is counted; and a step of adjusting gains and offsets of the position detecting signals on the basis of the obtained adjustment data.

11. The position detecting method according to claim 10, further comprising:

a step of detecting moving speed of the object;

a step of obtaining gain and offset variability data of the position detecting signals corresponding to the detected moving speed; and a step of adjusting gains and offsets of the position detecting signals on the basis of the obtained variability data and adjustment data corresponding to the counted wave number.

12. The position detecting method according to claim 10, further comprising:

a step of detecting ambient temperature of the position sensor;

a step of obtaining gain and offset variability data of the position detecting signals corresponding to the detected temperature; and a step of adjusting gains and offsets of the position detecting signals on the basis of the obtained variability data and adjustment data corresponding to the counted wave number.

13. A position detecting apparatus that detects a position of an object, comprising:

a position sensor that outputs at least two-phases of position detecting signals that change periodically or sinusoidally according to movement of the object;

a signal adjusting unit that performs gain and offset adjustment of each of the position detecting signals by using adjustment data;

a calculation unit that obtains a position of the object on the basis of the position detecting signals whose gains and offsets are adjusted; and a memory circuit that can store the adjustment data, wherein the memory circuit maintains storing the adjustment data at least until the position detecting apparatus operates this time; and wherein at the time of the operation start at this time, the signal adjusting unit performs the gain and offset adjustment by using the adjustment data which is stored in the memory circuit.

14. The position detecting apparatus according to claim 13, further comprising a volatile memory circuit that can store the adjustment data volatilely, wherein after the operation start at this time, the signal adjusting unit not only makes the adjustment data stored in the volatile memory circuit after obtaining it, and performs the gain and offset adjustment by using the newly obtained adjustment data.

15. The position detecting apparatus according to claim 13, further comprising a temperature detector detecting ambient temperature of the position sensor, wherein the memory circuit stores gain and offset variability data of the position detecting signals corresponding to temperature; and wherein the signal adjusting unit corrects the initial data on the basis of the temperature detected by the temperature detector, and the variability data stored in the memory circuit.

16. The position detecting apparatus according to claim 13, wherein the position sensor comprises a magnetic member periodically magnetized, and a magnetic detector that relatively moves with the magnetic member in connection with movement of the object and outputs at least two phases of position detecting signals that change periodically or sinusoidally according to a magnetic change due to the movement of the object.

17. The position detecting apparatus according to claim 13, wherein the position sensor comprises an optical scale member having a reflecting surface whose shape periodically changes, and an optical detector that relatively moves with the optical scale member in connection with movement of the object and outputs at least two phases of position detecting signals that change periodically or sinusoidally according to quantity of received light from light reflected on the optical scale member, which changes due to the movement, among light projected to the optical scale.

18. An optical apparatus comprising:

an optical system; and the position detecting apparatus according to claim 13 that detects a position of at least one optical element in the optical system.

19. The optical apparatus according to claim 18, further comprising a control unit controlling defocus correction of the optical system in connection with a temperature change, wherein an output of the temperature detector is also used for control of the defocus correction.

20. A position detecting method of adjusting gains and offsets of at least two phases of position detecting signals that change periodically or sinusoidally and are outputted from a position sensor according to movement of an object, and obtaining a position of the object on the basis of the position detecting signals whose gains and offsets are adjusted, comprising:

a first step of making the adjustment data, used for the gain and offset adjustment, stored;

a second step of performing the gain and offset adjustment by using the stored adjustment data as initial data when starting position detecting operation after the first step;

a third step of storing gain and offset variability data of the position detecting signals to a temperature change in a memory circuit;

a fourth step of detecting ambient temperature of the position sensor; and a fifth step of correcting the initial data on the basis of the detected temperature and the stored variability data.

21. The position detecting method according to claim 20, further comprising:

a sixth step of performing the gain and offset adjustment by using the corrected initial data.

22. A position detecting apparatus that detects a position of an object, comprising:

a position sensor that outputs at least two-phases of position detecting signals that change periodically or sinusoidally according to movement of the object;

a signal adjusting unit that performs gain and offset adjustment of each of the position detecting signals by using adjustment data; and a calculation unit that obtains a position of the object on the basis of the position detecting signals whose gains and offsets are adjusted;

wherein the signal adjusting unit adjusts gains and offsets of the position detecting signals on the basis of the adjustment data corresponding to a wave number of the position detecting signals from a reference position.

23. A position detecting method of adjusting gains and offsets of at least two phases of position detecting signals that change periodically or sinusoidally and are outputted from a position sensor according to movement of an object, and obtaining a position of the object on the basis of the position detecting signals whose gains and offsets are adjusted, comprising:

a step of obtaining adjustment data corresponding to a wave number of the position detecting signals from a reference position; and a step of adjusting gains and offsets of the position detecting signals on the basis of the obtained adjustment data.

* * * * *

UNITED STATES PATENT AND TRADEMARK OFFICE
CERTIFICATE OF CORRECTION

PATENT NO.   : 6,873,148 B2
DATED        : March 29, 2005
INVENTOR(S)  : Yosuke Morimoto It is certified that error appears in the above-identified patent and that said Letters Patent is hereby corrected as shown below:

Column 2,
Line 24, "note" should read -- not --.

Column 10,
Line 37, "V," should read -- $V_0$, --.

Column 12,
Line 51, "($T_{INIT}$– T0)" should read -- ($T_{INIT}$– $T_0$) --.
Line 52, "($V_{INIT}$– V0)" should read -- ($V_{INIT}$– $V_0$) --.

Column 13,
Line 2, "$T_0(k)<T<T_0(k+1)$" should read -- $T_G(k)<T<T_G(k+1)$ --.
Line 3, "$V_0(k)<V<V_0$" should read -- $V_G(k)<V<V_G$ --.
Line 9, "(T– T0)" should read -- (T– $T_0$) --.
Line 9, "(V– V0)" should read -- (V– $V_0$) --.

Column 18,
Line 12, "needs" should read -- proceeds --.

Column 21,
Line 63, "($T_{INIT}$– T0)" should read -- ($T_{INIT}$– $T_0$) --.

Column 22,
Line 6, "$T_0(k)<T<T_0(k+1)$" should read -- $T_G(k)<T<T_G(k+1)$ --.
Line 10, "(T– T0)" should read -- (T– $T_0$) --.

UNITED STATES PATENT AND TRADEMARK OFFICE
CERTIFICATE OF CORRECTION

PATENT NO. : 6,873,148 B2
DATED : March 29, 2005
INVENTOR(S) : Yosuke Morimoto

It is certified that error appears in the above-identified patent and that said Letters Patent is hereby corrected as shown below:

<u>Column 23,</u>
Line 15, "gised" should read -- gized --.

Signed and Sealed this

Twenty-eighth Day of February, 2006

JON W. DUDAS
*Director of the United States Patent and Trademark Office*